US012585467B2

(12) United States Patent
Huang et al.

(10) Patent No.: US 12,585,467 B2
(45) Date of Patent: Mar. 24, 2026

(54) HIGH LEVEL GRAPH COMPUTING SYSTEM

(71) Applicants: Joshua Huang, Cupertino, CA (US); Hsilin Huang, Cupertino, CA (US)

(72) Inventors: Joshua Huang, Cupertino, CA (US); Hsilin Huang, Cupertino, CA (US)

( * ) Notice: Subject to any disclaimer, the term of this patent is extended or adjusted under 35 U.S.C. 154(b) by 0 days.

(21) Appl. No.: 18/663,946

(22) Filed: May 14, 2024

(65) Prior Publication Data

US 2025/0208873 A1 Jun. 26, 2025

Related U.S. Application Data

(60) Provisional application No. 63/614,761, filed on Dec. 26, 2023.

(51) Int. Cl.
*G06F 9/30* (2018.01)
(52) U.S. Cl.
CPC ................................ *G06F 9/30101* (2013.01)
(58) Field of Classification Search
None
See application file for complete search history.

(56) References Cited

U.S. PATENT DOCUMENTS

| | | | | |
|---|---|---|---|---|
| 11,593,295 | B2 * | 2/2023 | Fleming, Jr ........ | G06F 9/30145 |
| 2014/0351551 | A1 * | 11/2014 | Doerr .................. | G06F 9/30145 |
| | | | | 711/204 |
| 2019/0138492 | A1 * | 5/2019 | Dobbs ..................... | G06F 9/542 |
| 2019/0187963 | A1 * | 6/2019 | Bokhari ................... | G06F 8/35 |
| 2019/0266387 | A1 * | 8/2019 | Sun ....................... | G06V 40/171 |
| 2019/0373264 | A1 * | 12/2019 | Chong ................... | H04N 19/91 |
| 2020/0233670 | A1 * | 7/2020 | Alexander .............. | G06N 3/08 |
| 2022/0415007 | A1 * | 12/2022 | Zhang ................ | G06V 10/7715 |
| 2023/0412281 | A1 * | 12/2023 | Das Sharma ........ | H04B 10/516 |
| 2024/0028555 | A1 * | 1/2024 | Pawlowski ........... | G06F 15/173 |

* cited by examiner

*Primary Examiner* — Eric Coleman
(74) *Attorney, Agent, or Firm* — Ariel S. Bentolila; Bay Area IP Group

(57) ABSTRACT

A Data Flow processor (DFP or DFPU) including a plurality of loop registers to effectively control the processing of multi-dimensional data; and a plurality of stride registers that are operable for precise addressing of data, enabling comprehensive management of data fetching, execution, accumulation, and result write-back processes; and wherein the processor is configured to be operable for high-dimensional computing.

30 Claims, 24 Drawing Sheets

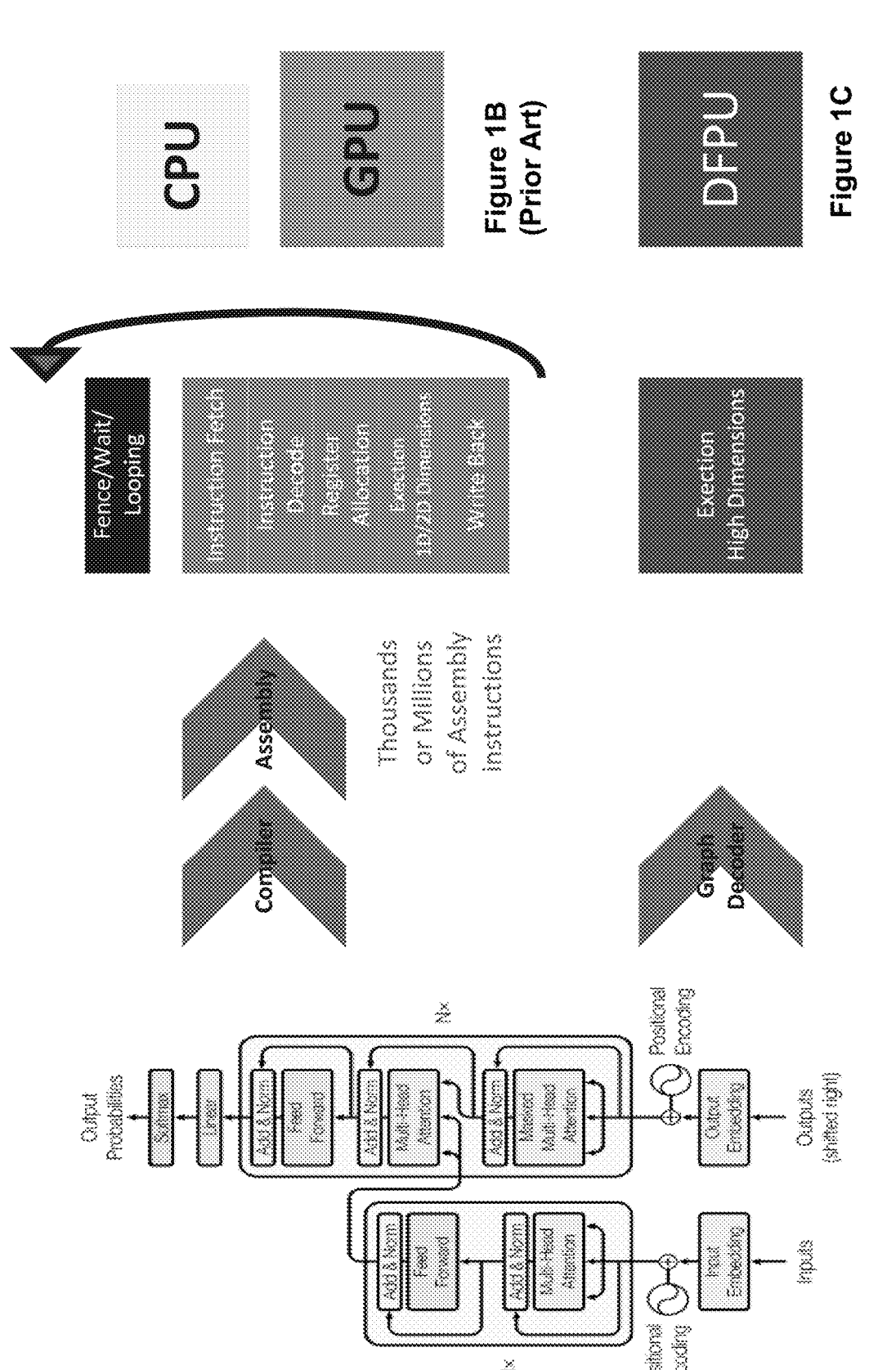

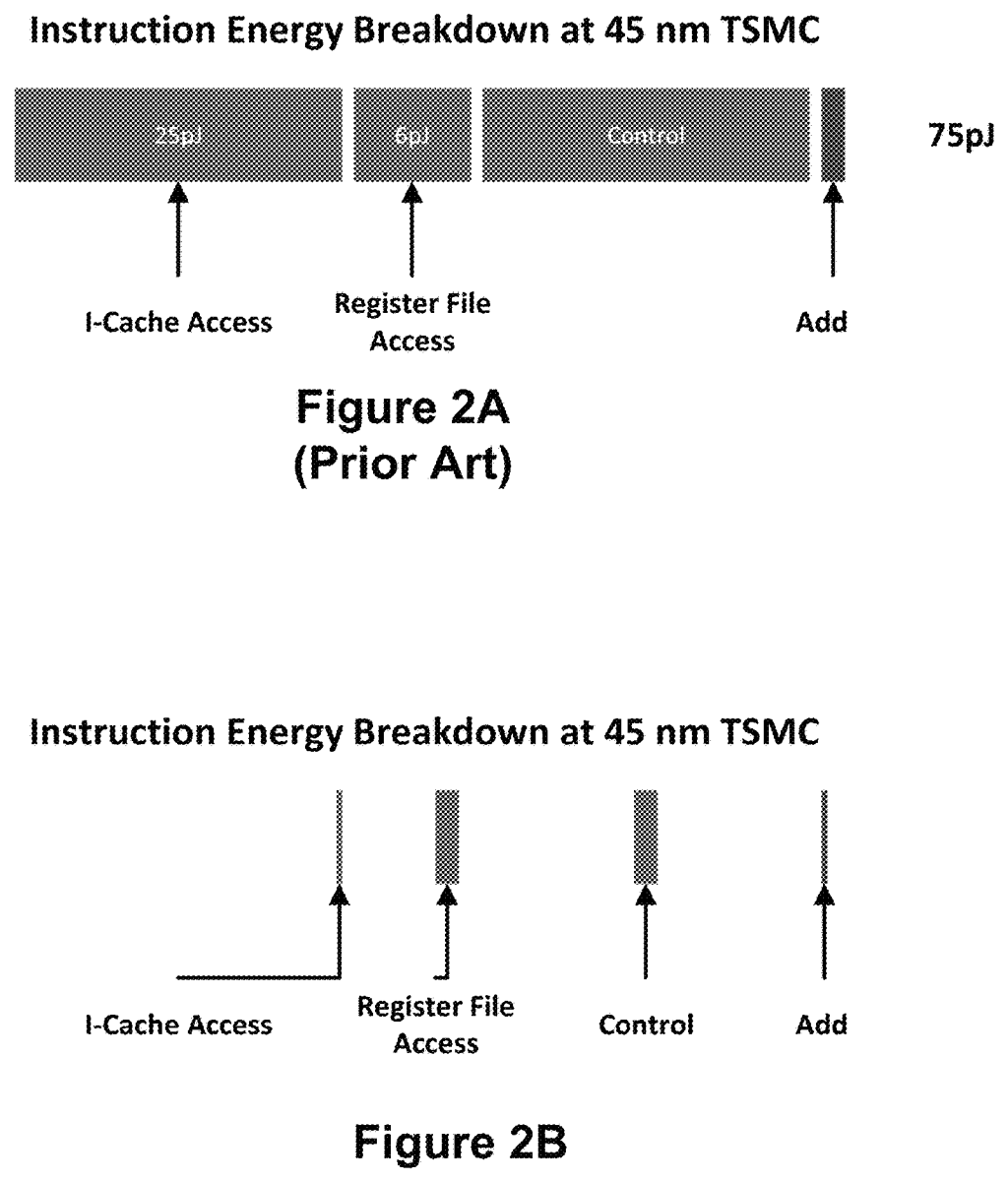

Instruction Energy Breakdown at 45 nm TSMC

75pJ

Control

I-Cache Access     Register File Access     Add

**Figure 2A
(Prior Art)**

Instruction Energy Breakdown at 45 nm TSMC

I-Cache Access     Register File Access     Control     Add

DFPU

Data flow processor unit

Multiple threads
Data Driven Flow
Processor control loop

310

GPU

Multiple threads
parallel Data
Software control loop

305

CPU

2-16 threads
Small Data
Software control loop

ALUs

405

410

415

ALUs

420

425

430/435

440

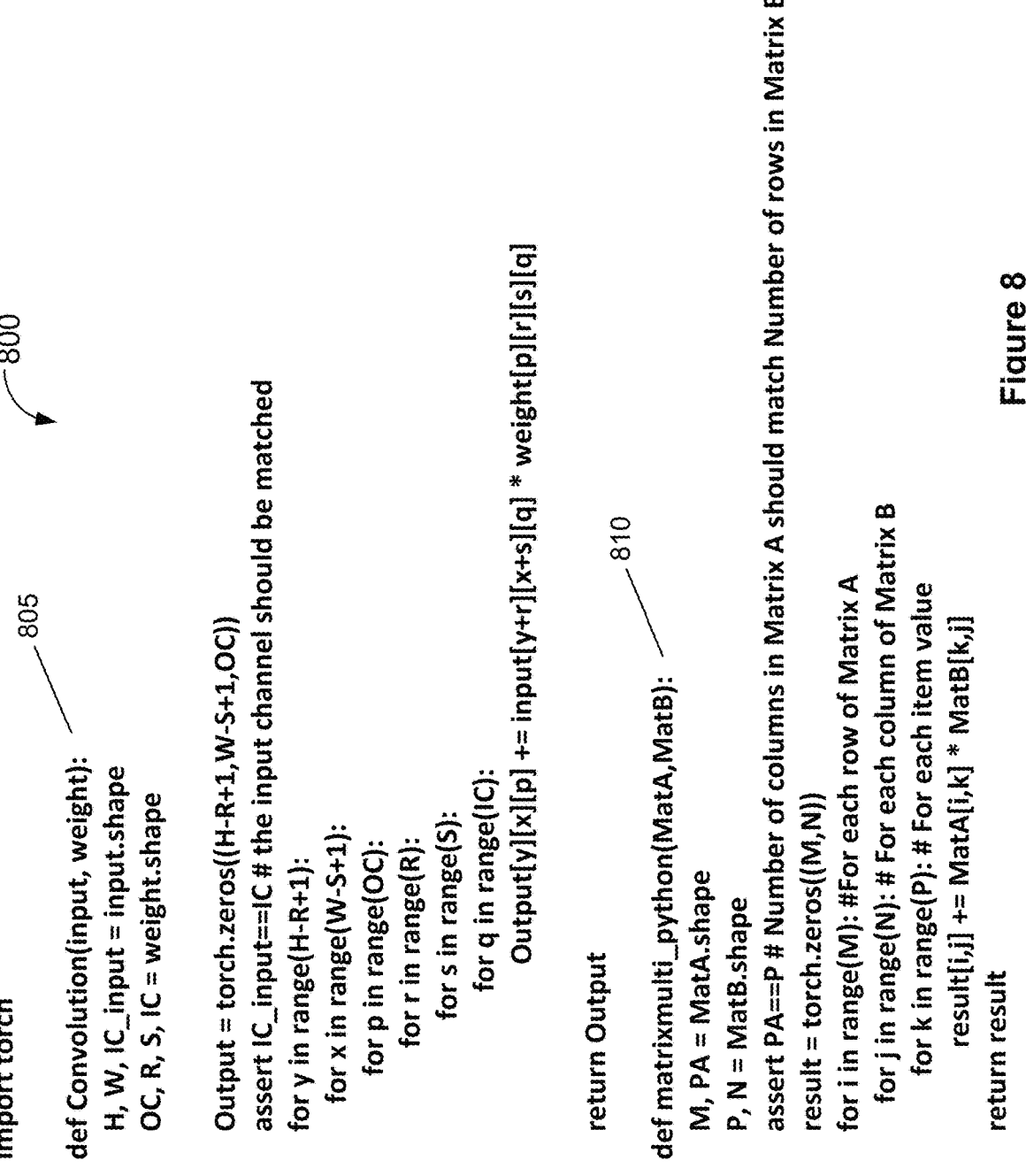

```
import torch def Convolution(input, weight):
    H, W, IC_input = input.shape
    OC, R, S, IC = weight.shape Output = torch.zeros((H-R+1,W-S+1,OC))
    assert IC_input==IC # the input channel should be matched
    for y in range(H-R+1):
        for x in range(W-S+1):
            for p in range(OC):
                for r in range(R):
                    for s in range(S):
                        for q in range(IC):
                            Output[y][x][p] += input[y+r][x+s][q] * weight[p][r][s][q]

return Output def matrixmulti_python(MatA,MatB):
    M, PA = MatA.shape
    P, N = MatB.shape
    assert PA==P # Number of columns in Matrix A should match Number of rows in Matrix B
    result = torch.zeros((M,N))
    for i in range(M): #For each row of Matrix A
        for j in range(N): # For each column of Matrix B
            for k in range(P): # For each item value
                result[i,j] += MatA[i,k] * MatB[k,j]
    return result
```

HIGH LEVEL GRAPH COMPUTING SYSTEM

CROSS-REFERENCE TO RELATED APPLICATIONS

The present Utility patent application claims priority benefit of the U.S. provisional application for patent Ser. No. 63/614,761, entitled "High Level Graph Computing System", filed on Dec. 26, 2023 under 35 U.S.C. 119 (e). The contents of this related provisional application are incorporated herein by reference for all purposes to the extent that such subject matter is not inconsistent herewith or limiting hereof.

RELATED CO-PENDING U.S. PATENT APPLICATIONS

Not applicable.

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

BACKGROUND OF THE RELEVANT PRIOR ART

One or more embodiments of the invention generally relate to computing systems. More particularly, certain embodiments of the invention relate to data flow processing units.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that Traditional processors, CPUs, and GPUs, followed compiler-generated assembly instructions, requiring an intricate, energy-draining process. Every instruction, with dependencies and data hazards, had to be executed step by step, wasting time and resources. Rather than piecing a puzzle together brick by brick, work with the full picture, making AI tasks faster, more energy-efficient, and less prone to errors. Due to deficiencies in traditional computing systems, innovations revolutionizing AI computing by simplifying processor architecture and paving the way for a more efficient and accessible AI future becomes a necessity.

Referring to FIG. 1A, a transformer model design originating from Google® for Language Model-based systems is shown. When a device works with the model, the initial step involves loading the model into memory, such as DRAM or HBM-type memory. Subsequently, there may be two distinct compilers in play: a high-level compiler for graph compilation and a low-level compiler for generating assembly code. The compilers come in two varieties—a real-time compiler and an offline (pre-compiled) compiler.

Referring to FIG. 1B, the traditional compiler shown generates thousands or even millions of assembly instructions, which are then processed by a device's CPU, GPU, NPU, or TPU. The process includes fetching instructions, decision-making on instructions, allocating registers, executing instructions, writing back results, checking for data hazards, and looping through these instructions until the entire graph is completed. The sequence may consume a significant amount of power.

FIG. 2A illustrates a conventional/traditional instruction-based processor architecture, specifically detailing the energy distribution for instructions within a 45 nm TSMC process. Notably, I-Cache Access, Register File access, and the Control segment of the add instruction account for the majority of the instruction's energy consumption. The actual addition operation within this instruction represents just a minuscule fraction of the overall energy utilization.

FIG. 3A illustrates typical CPUs 305, known for their adaptability in handling various applications, excel at managing small-scale data and conditional branches like if-else statements. CPUs 305 may exhibit overhead, notably in I-Cache retrieval and control logic. CPUs 305 rely on high and low-level compilers for assembly-level code compilation and usually feature a small number of threads, typically two to sixteen, to address latency. On the other hand, GPUs 305 are specialized for parallel data processing, making GPUs ideal for parallel computing tasks. Yet, GPUs struggle when dealing with numerous conditional branches within a data set. GPUs, like CPUs, employ similar compilers for assembly-level code generation. Notably, GPUs utilize branch predication to enhance performance, evaluating both sides of a branch and discarding one result based on the Boolean branch condition. There is a need for a technique that aims to improve the efficiency of conditional statements.

FIG. 4A illustrates a traditional memory hierarchy in typical processors. A traditional hierarchical memory architecture may include several layers including, without limitation, Registers 420, L1 425, L2 430, and L3 435 caches, and the main memory 440, which may be either DRAM (Dynamic Random-Access Memory) or HBM (High Bandwidth Memory).

Details of Each Component:

Registers 420: In traditional processors, there may be a substantial collection of registers. The registers serve as high-speed storage locations directly within the CPU (Central Processing Unit). They are used for quick access and manipulation of data during operations. The registers in this context are numerous and diverse, designed to accommodate a wide range of operations and data types, making them a crucial part of the processor's computational power.

L1 Cache 425: The L1 cache, or Level 1 cache, is the first level of cache memory in the hierarchy. It may be a small but extremely fast cache that is part of the CPU. L1 cache may be dedicated to providing even faster data access compared to the main memory. It stores frequently accessed data and instructions for rapid retrieval by the processor cores.

L2 Cache 430: The L2 cache, or Level 2 cache, is the second level of cache memory. It may be larger than the L1 cache and operates at a slightly slower speed. The purpose of the L2 cache is to hold additional data and instructions that may not fit in the L1 cache but are still required for efficient processing.

L3 Cache 435: The L3 cache serves as a shared cache for multiple cores in a multi-core processor. It may be typically larger and slower than the L1 and L2 caches. The L3 cache aims to provide a compromise between speed and capacity, ensuring that frequently shared data may be efficiently accessed by all processor cores.

DRAM or HBM 440: At the bottom of the traditional processor's memory hierarchy is the main memory, which may be either DRAM or HBM. These are larger memory pools compared to the caches, but they have higher latency and slower access times. DRAM is a common type of main memory in most systems, while HBM is known for its high data transfer speeds, making it suitable for applications demanding high bandwidth.

In view of the foregoing, it is clear that these traditional techniques are not perfect and leave room for more optimal approaches.

BRIEF DESCRIPTION OF THE DRA WINGS

The present invention is illustrated by way of example, and not by way of limitation, in the figures of the accompanying drawings and in which like reference numerals refer to similar elements and in which:

FIG. 1A illustrates a typical transformer model design originating from Google® for Language Model-based systems.

FIG. 1B illustrates a traditional compiler generating thousands or even millions of assembly instructions, which are processed by a device's CPU, GPU, NPU, or TPU;

FIG. 1C is an illustration of a DFPU compiler, in accordance with an embodiment of the present invention;

FIG. 2A illustrates a conventional/traditional instruction-based processor architecture detailing an energy distribution for instructions within a 45 nm TSMC process;

FIG. 2B illustrates an exemplary data flow process based on a High-Level graph computing architecture, in accordance with an embodiment of the present invention;

FIG. 8 is an overview of an exemplary Python® function for performing a convolution and Python® function for matrix multiplication, in accordance with an embodiment of the present invention;

Figure 1D:
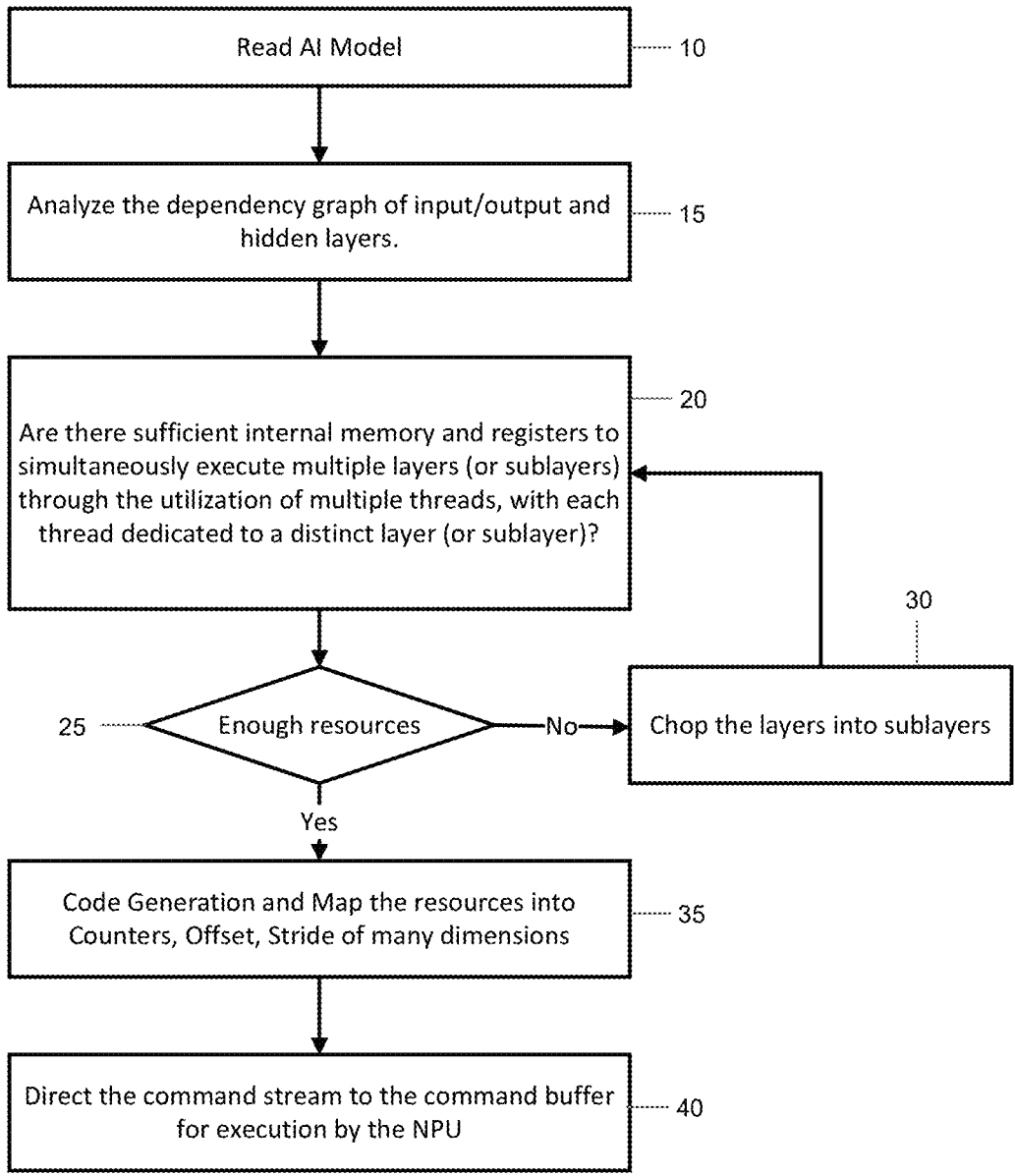
FIG. 1D and FIG. 1E illustrate an exemplary method and weights transformation remapping for optimizing the execution of deep learning models on Neural Processing Units (NPU), in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

CPU (Central Processing Unit):

Purpose: CPUs are versatile and handle a wide range of instructions, making them suitable for sequential processing and complex decision-making tasks, including running the operating system and various software applications.

Threads: CPUs typically possess a limited number of high-performance cores, each capable of running multiple threads to support multitasking and enhance system performance.

Thread Management: CPU threads are managed by the operating system, allocating processing time, managing synchronization, and handling context switching.

GPU (Graphics Processing Unit):

Purpose: GPUs excel at parallel processing, designed for tasks like 3D graphics rendering, video encoding/decoding, scientific simulations, and deep learning, handling large amounts of data simultaneously.

Threads: GPUs boast numerous small, low-power cores capable of executing a high number of threads, optimized for data parallelism.

Thread Management: GPU threads are managed by the GPU itself, with a scheduling mechanism to map threads to available cores for optimal throughput.

Different Definitions of Threads:

CPU Threads: CPU threads pertain to execution units within a CPU core, suitable for multitasking and parallelizing tasks.

GPU Threads (Shader Threads or CUDA Threads): GPU threads refer to individual execution units within a GPU core, optimized for parallel processing tasks that may be divided into numerous simultaneous operations.

In summary, CPUs and GPUs serve distinct roles due to their architectures and purposes. CPUs are versatile and apt for general computing, while GPUs excel in parallel processing and data-intensive operations. The concept of threads in each context pertains to how they handle parallelism and concurrent execution, aligning with their respective functions.

Data Flow Based Computing:

Data Flow-Based Computing is an innovative approach to computational processing that revolves around the utilization of high-level graph representations to map hardware control flows. The methodology offers several advantages in terms of processing input data, managing weights, and executing operations in a highly abstracted, graph-based environment. One notable feature of Data Flow-Based Computing is the support for multiple threads, enhancing parallelism and the overall efficiency of computing systems.

Key Elements of Data Flow-Based Computing:

High-Level Graph Mapping: Data Flow-Based Computing begins with the translation of complex computational tasks into high-level graphs. The graphs outline the flow of data, the operations to be performed, and the interactions between different components. The graphical representation simplifies the complex computations, making them more manageable.

Hardware Control Flow: The hardware components are designed to follow the control flow dictated by the high-level graph. The control flow ensures that data may be processed in the order and manner specified by the graph, leading to efficient execution of operations.

Graph Processing: Data Flow-Based Computing relies on the hardware's ability to execute operations at a high level of abstraction, mirroring the structure of the graph. The approach minimizes the need for lower-level instructions and simplifies the hardware's role in processing complex tasks.

Support for Multiple Threads: Multi-threading is a crucial aspect of Data Flow-Based Computing, enabling the concurrent execution of tasks. Multiple threads may work on different parts of the high-level graph, enhancing performance and responsiveness.

Overall, Data Flow-Based Computing represents a paradigm shift in the world of computational processing, offering a more intuitive, graph-based approach to managing and executing complex computations. The approach not only simplifies the development of high-performance computing systems but also enhances their efficiency and scalability, making them suitable for a wide range of applications, from scientific simulations to artificial intelligence.

In this approach, the high-level graph serves as a blueprint for how the hardware components should interact and execute instructions. The hardware, guided by this graphical representation, orchestrates the processing of input data, weights, and operations in a manner that is aligned with the high-level structure of the graph.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially "] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/ services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/ components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them-Such terms are open-ended and mean "including but not limited to". When employed in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/ dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to data processing unit. The approach revolves around minimizing instruction redundancy. This may be achieved by condensing an entire graph layer into just one or a few concise instructions. Additionally, shadow registers are employed to efficiently access a larger register file, thereby mitigating power consumption. Furthermore, the control mechanism may be simplified and elevated to a high-level dimension, rather than managing it per operation. The strategic move substantially curtails the power overhead associated with I-Cache Access, Register File Access, and Control components. Additionally, the use of an adder tree may be facilitated to further reduce power consumption in the addition process.

A "computer" that executes system/method embodiments of the present invention may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; a smart phone; a PAD; phablets; smart watches; wearable computers; gaming devices/computers and/or entertainment systems; televisions; a netbook, a set-top box (STB); a mobile device; a wearable device (for example, a smart watch); an Internet of Things (IoT) device; application-specific hardware to emulate a computer and/or software, such as, for example, a digital signal processor (DSP), a field-programmable gate array (FPGA), fixed logic, finite state machines, and/or other circuits, an application specific integrated circuit (ASIC), an application specific instruction-set processor (ASIP); a chip; chips; a system on a chip; or a chip set; a data acquisition device; an optical computer; a quantum computer; a biological computer; and generally, an apparatus that may accept data, process data according to one or more stored software programs, generate results, and typically include input, output, storage, arithmetic, logic, and control units; and the like. That is, the computer processor may be implemented by employing various control logic of the computer device, which may be a general purpose processor, a Digital Signal Processor (DSP), an Application Specific Integrated Circuit (ASIC), graphics processing unit (GPU), a Field Programmable Gate Array (FPGA), a single-chip microcomputer, ARM (Acorn RISC Machine) or other programmable logic device, discrete gate or transistor logic, discrete hardware components, or any combination of these components. Also, the computer processor may be any conventional processor, microprocessor, or state machine. The computer processor may also be implemented as a combination of computing devices, e.g., a combination of a DSP and a microprocessor, a plurality of microprocessors, one or more microprocessors in conjunction with a DSP core, or any other such configuration.

The Hardware portion of the processing circuitry of the computer can include electric or electronic components configured to perform operations of the processing circuitry. The electric or electronic components can include one or more resistors, transistors, capacitors, diodes, inductors, logic gates (e.g., AND, OR, XOR, negate, buffer, or the like), amplifiers, memory devices, power supplies, analog to digital converters, digital to analog converters, oscillators, switches, multiplexers, buses, input/output ports, or the like.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. The embodiments herein closed are merely illustrative, wherein elements illustrated as separate elements may or may not be physically separate, and elements shown as elements may or may not be physical elements, may be located in one place, or may be distributed over a plurality of network elements. Some or all of any disclosed modules may be selected according to actual needs to achieve the purpose of the solution of the particular embodiment of the invention.

Furthermore, while the invention is described in the context of functional modules, it should be appreciated that, unless otherwise indicated, one or more of the described functions and/or features may be integrated in a single physical device and/or software module or one or more functions and/or features may be implemented in separate physical devices or software modules. It will also be appreciated that a detailed discussion of the actual implementation of each module is not necessary to an understanding of the present invention. Rather, the actual implementation of the various functional modules in the apparatus disclosed herein will be apparent to those skilled in the art from consideration of their attributes, functions and internal relationships. Accordingly, one of ordinary skill in the art can implement the invention as set forth in the claims without undue experimentation. It is also to be understood that the specific concepts disclosed are merely illustrative and are not intended to be limiting upon the scope of the invention, which is to be defined in the appended claims and their full scope of equivalents.

Logic and/or steps represented in the flowcharts or otherwise described herein, e.g., a ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. For the purposes of this description, a "computer-readable medium" can be any means that can contain, store, communicate, propagate, or transport the program for use by or in connection with the instruction execution system, apparatus, or device.

"Software" may refer to prescribed rules to operate a computer. Examples of software may include: code segments in one or more computer-readable languages; graphical and or/textual instructions; applets; pre-compiled code; interpreted code; compiled code; and computer programs. Embodiments of the present invention may be implemented by means of software plus a general purpose hardware platform, or may be implemented by hardware executing state machine logic. Based on such understanding, any references to "Software" herein also refers to technical solutions that may be embodied essentially or in a part contributing to the related art in the form of a software or firmware product, which may exist in a computer-readable storage medium such as EEPROM/ROM/RAM, a magnetic disk, an optical disk, etc., including several instructions or logical gate functional sequences for causing a computer device (which may be a personal computer, a server, or a network device, etc.) to execute the method of the respective embodiments or some parts of the embodiments.

That is, the functions, if implemented in the form of software functional units and sold or used as a stand-alone product, may be stored in a computer-readable storage medium. Based on this understanding, the technical solution of the present invention may be embodied essentially or in a part contributing to the prior art or in a part of the technical solution in the form of a software product stored in a storage medium, comprising several instructions for causing an electronic device (which may be a personal computer, a server, a network device, etc.) to perform all or part of the steps of the method according to the embodiments of the present invention. And the aforementioned storage medium includes: a U-disk, a removable hard disk, a Read-Only Memory (ROM), a random access Memory (RAM, random Access Memory), a magnetic disk, or an optical disk, or other various media capable of storing program codes.

Hence, generally, functions described herein (for example, the features illustrated in the figures of this application) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While embodiments herein may be discussed in terms of a processor having a certain number of bit instructions/data, those skilled in the art will know others that may be suitable such as 16 bits, 32 bits, 64 bits, 128s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention may be described below with reference to flowchart illustrations and/or block diagrams of methods, apparatus (systems) and computer program products according to embodiments of the invention. In some alternative embodiments, the functions/acts noted in the block diagrams may occur out of the order noted in the operational illustrations. For example, two blocks shown in succession may in fact be executed substantially concurrently or the blocks may sometimes be executed in the reverse order, depending upon the functionality/acts involved. Furthermore, the embodiments presented and described in the flowcharts of the present invention are provided by way of example in order to provide a more thorough understanding of the technology. The disclosed methods are not limited to the operations and logic flows presented herein. Alternative embodiments are contemplated in which the order of various operations is changed, and in which sub-operations described as part of a larger operation are performed independently.

It will be understood that each block of flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. More generally, Volatile memory media may include Random Access Memory (RAM), which acts as external cache memory. By way of illustration and not limitation, RAM may be available in many forms such as Synchronous RAM (SRAM), dynamic RAM, (DRAM), synchronous DRAM (SDRAM), double data rate SDRAM (DDR SDRAM), enhanced SDRAM (ESDRAM), synchlink DRAM (SLDRAM), and Direct Rambus RAM (DRRAM). The disclosed memory components or memories of the operating environments for implementing systems and methods that carry out the present invention may comprise one or more of these and/or any other suitable types of memory.

Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read. Any computing memory may be coupled via a communication bus or otherwise.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc. In client/server environments, the server may be located in a cloud platform anywhere in the network, whereby the cloud platform includes, but is not limited to, a single network server, a server group formed by a plurality of network servers, or a cloud formed by a large number of computers or network servers in cloud computing, wherein the cloud computing is one of distributed computing, and is a super virtual computer formed by a group of loosely coupled computer sets. The computer device can be used for realizing the application by running alone, and can also be accessed into a network and realized by interaction with other computer devices in the network. Wherein the network in which the computer device is located includes, but is not limited to, the internet, a wide area network, a metropolitan area network, a local area network, a VPN network, and the like. The client or terminal equipment and the cloud platform are mutually communicated to form the system(s) provided by embodiments of the disclosed applications.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," "matching" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As a general matter, the methods and systems described herein comprising any such "processing," "computing," "calculating," "determining," "matching," or the like, actions and/or processes may include, or otherwise make use of in conjunction with other algorithmic/programming techniques, one or more machine-trained models to carry out one or more function(s) or claimed purpose(s)/intent(s)/object(s) of any aspect of the invention. Machine learning (ML) generally involves various algorithms that a computer can automatically learn over time. The foundation of these algorithms is generally built on mathematics and statistics that can be employed to predict events, classify entities, diagnose problems, and model function approximations. As an example, a system can be trained using data generated by a ML model in order to identify patterns in user activity, determine associations between various words and contents (e.g., icons, images, or emoticons) and/or identify suggested contents that relate to a text entered by a given user. Such determination may be made following the accumulation, review, and/or analysis of user data from a large number of users over time, that may be configured to provide the ML algorithm (MLA) with an initial or ongoing training set. In addition, in some implementations, a user device can be configured to transmit data captured locally during use of relevant application(s) to the cloud or the local ML program and provide supplemental training data that can serve to fine-tune or increase the effectiveness of the MLA. The supplemental data can also be used to facilitate identification of contents and/or to increase the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the models used by the system can be revised or regenerated to reflect the updates to the training data. Over time, the training system (whether stored remotely, locally, or both) can be configured to receive and accumulate more and more training data items, thereby increasing the amount and variety of training data available for ML model training, resulting in increased accuracy, effectiveness, and robustness of trained ML models.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. It is to be understood that portions of the present invention may be implemented in hardware, software, firmware, or a combination thereof. In the above-described embodiments, the various steps or methods may be implemented in software or firmware stored in a memory and executed by a suitable instruction execution system. For example, if implemented in hardware, as in another embodiment, may be implemented using any one or combination of the following techniques, as is well known in the art: discrete logic circuits having logic gates for implementing logic functions on data signals, application specific integrated circuits having suitable combinational logic gates, programmable Gate Arrays (PGAs), field Programmable Gate Arrays (FPGAs), and the like.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium may include, but is not limited to, a hard drive, compact disc, flash memory, volatile memory, random access memory, magnetic memory, optical memory, semiconductor based memory, phase change memory, periodically refreshed memory, quantum memory, and the like; the non-transitory computer readable medium, however, does not include a pure transitory signal per se; i.e., where the medium itself is transitory.

The present invention will now be described in detail with reference to embodiments thereof as illustrated in the accompanying drawings.

Figure 1E:
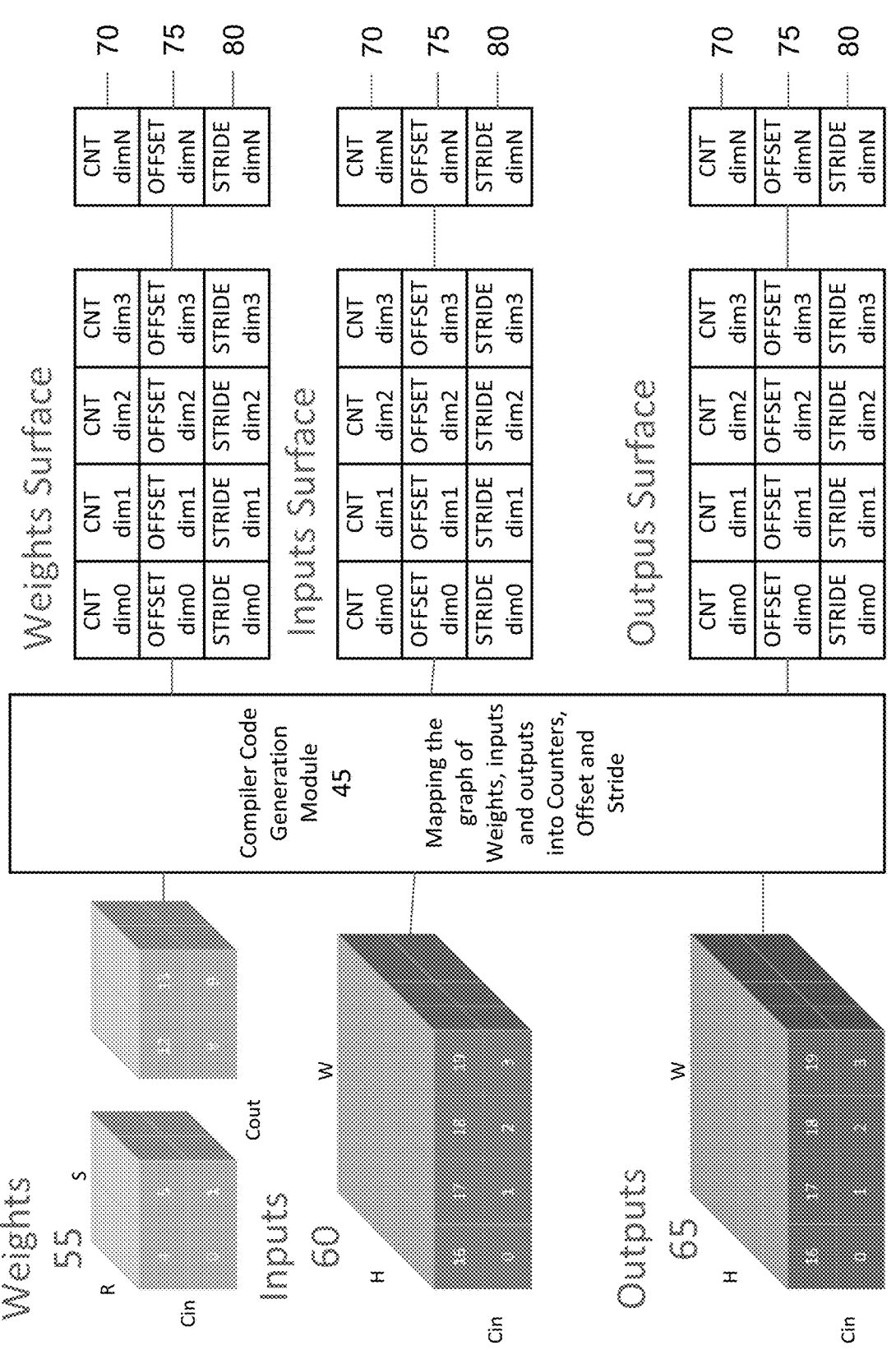

FIG. 1C through FIG. 1E are illustrations of an exemplary DFPU compiler, in accordance with an embodiment of the present invention. In particular, FIG. 1D and FIG. 1E illustrate an exemplary method and weights transformation remapping for optimizing the execution of deep learning models on Neural Processing Units (NPU), in accordance with an embodiment of the present invention. Referring to FIG. 1C, the method may involve, without limitation, reading an AI model in a Step 10, analyzing a dependency graph of an input/output and hidden layers of the AI model in a Step 15, determining the availability of sufficient internal memory and registers to execute multiple layers simultaneously using multiple threads in a Step 20, generating optimized code and mapping resources into counters, offset, and stride of multiple dimensions in a Step 35, and directing the command stream for execution by the NPU in a Step 40.

Description

Read AI Model:

The system reads an AI model, comprising layers of neural network operations in Step 10.

Analyze the Dependency Graph:

The dependency graph of input/output and hidden layers is analyzed to understand the relationships and dependencies between layers in Step 15.

Evaluate Resource Availability:

The system evaluates whether there are sufficient internal memory and registers to simultaneously execute multiple layers (or sublayers) using multiple threads, with each thread dedicated to a distinct layer (or sublayer) in Step 20.

Check Resource Availability in a Step 25:

If there are enough resources available, the process proceeds to Step 35. Otherwise, it jumps to Step 30.

Code Generation and Resource Mapping:

Optimized code is generated based on the analysis, and resources are mapped into counters, offset, and stride of multiple dimensions to efficiently execute the layers in Step 35.

Command Stream Execution:

The command stream, generated in Step 35, is directed to the command buffer for execution by the NPU in Step 40.

Sub Layering:

If there are not enough resources available, the layer is chopped into sublayers in Step 30, and the process loops back to Step 20 for reevaluation.

The method allows for efficient execution of deep learning models on NPUs by dynamically adjusting the resource allocation based on the complexity of the model and the availability of resources. This enables the NPU to efficiently handle a wide range of AI models with varying complexities while maximizing performance and minimizing latency.

Referring to FIG. 1E, an exemplary compiler code generation 45 is employed to map weights tensor 55, inputs tensor 60, and outputs tensor 65 into multiple dimensions of counters 70, strides 80, and offsets 75.

Counter 70 denotes the number of loops for the current dimension, along with associated stride 75 used for address calculation in each loop iteration. Offset 80 indicates the address offset within the current dimension. The stride signifies the incremental change in address for each step.

For instance, considering three dimensions represented by i, j, and k: where i corresponds to dim0, j corresponds to dim1, and k corresponds to dim2. The indices i, j, and k iterate within their respective ranges (0 to CNT_dim0, 0 to CNT_dim1, and 0 to CNT_dim2).

The chunk of addresses for input tensor 60 is computed as follows:

$$\text{offset\_dim0} + \text{offset\_dim1 (if j is not zero)} + \text{offset\_dim2 (if k is not zero)} + i * \text{stride\_dim0} + j * \text{stride\_dim1} + k * \text{stride\_dim2}.$$

The identical formula can be employed for both weights 55 and outputs 65 tensors, encompassing multiple dimensions.

FIG. 2B illustrates an exemplary data flow process based on a High-Level graph computing architecture, in accordance with an embodiment of the present invention. The Data Flow process decodes and compiles the graph while considering inputs, the entire graph, and its associated weights at a very high level. The process treats the entirety as high-dimensional tensors and a graph, streamlining high-level graph computing.

Figure 3B:
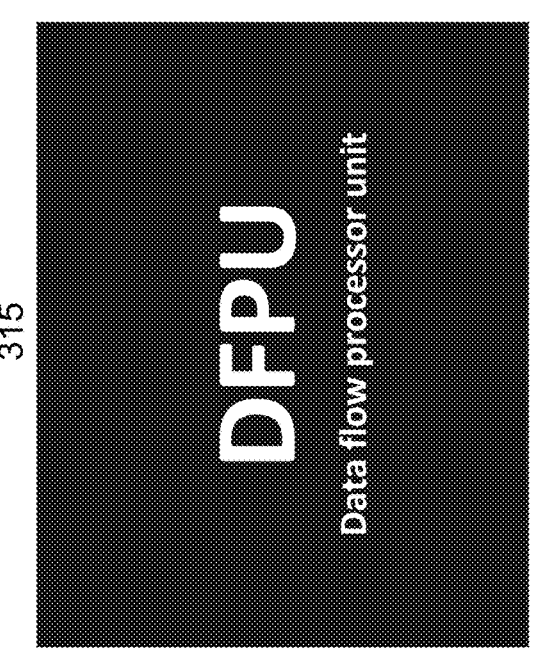
FIG. 3B shows a Data Flow Processor Unit (DFPU), in accordance with an embodiment of the present invention.
Figure 3A:
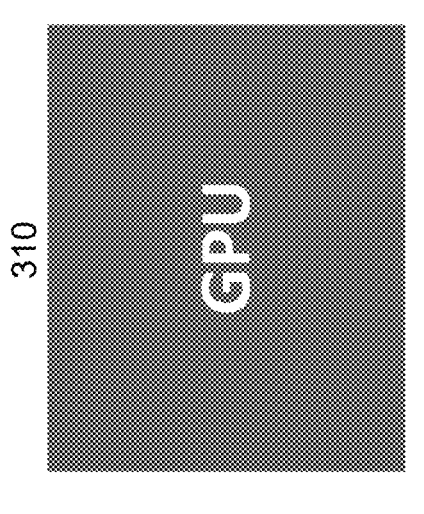
FIG. 3A illustrates typical CPUs 305 known for their adaptability in handling various applications, excel at managing small-scale data and conditional branches like if-else statements.

FIG. 3B is an illustration of an exemplary processor type (DFPU) 315, in accordance with an embodiment of the present invention.

Figure 3C:
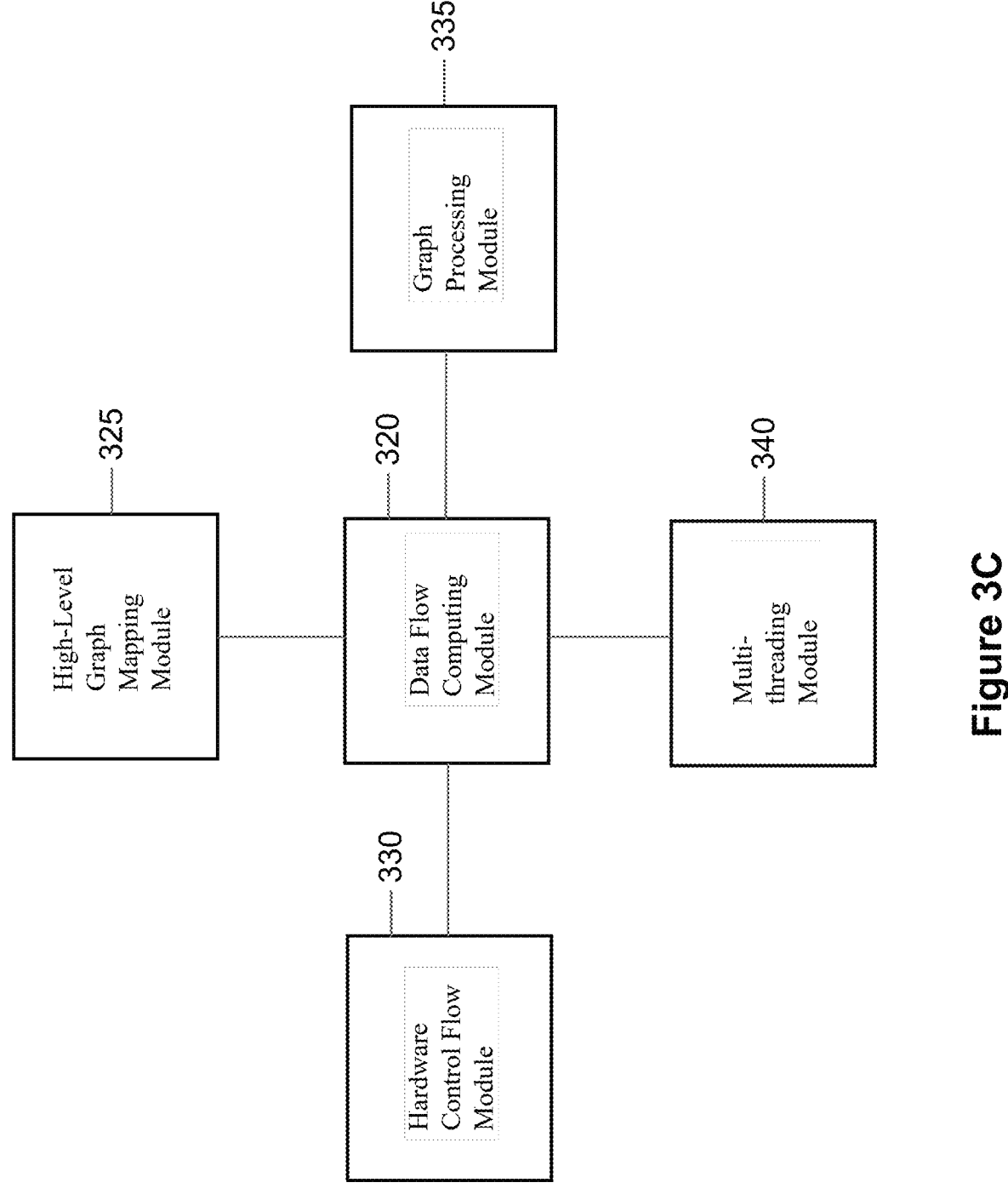
FIG. 3C is a system module diagram illustrating of an exemplary Data Flow-Based Computing System, in accordance with an embodiment of the present invention.

FIG. 3C is a system module diagram illustrating an exemplary Data Flow-Based Computing System, in accordance with an embodiment of the present invention. Data Flow-Based Computing is an innovative approach to computational processing that revolves around the utilization of high-level graph representations to map hardware control flows. The methodology offers several advantages in terms of processing input data, managing weights, and executing operations in a highly abstracted, graph-based environment. One of its notable features is the support for multiple threads, enhancing parallelism and the overall efficiency of computing systems.

In this approach, the high-level graph serves as a blueprint for how the hardware components should interact and execute instructions. The hardware, guided by the graphical representation, orchestrates the processing of input data, weights, and operations in a manner that may be aligned with the high-level structure of the graph.

Key Elements of Data Flow-Based Computing:

High-Level Graph Mapping Module 325: Data Flow-Based Computing 320 begins with the translation of complex computational tasks into high-level graphs. The graphs outline the flow of data, the operations to be performed, and the interactions between different components. The graphical representation simplifies the complex computations, making them more manageable.

Hardware Control Flow Module 330: The hardware components are designed to follow the control flow dictated by the high-level graph. The control flow ensures that data may be processed in the order and manner specified by the graph, leading to efficient execution of operations.

Graph Processing Module 335: Data Flow-Based Computing relies on the hardware's ability to execute operations at a high level of abstraction, mirroring the structure of the graph. The approach minimizes the need for lower-level instructions and simplifies the hardware's role in processing complex tasks.

Support for Multiple Threads Module 340: Multi-threading is a crucial aspect of Data Flow-Based Computing, enabling the concurrent execution of tasks. Multiple threads may work on different parts of the high-level graph, enhancing performance and responsiveness.

Overall, Data Flow-Based Computing represents a paradigm shift in the world of computational processing, offering a more intuitive, graph-based approach to managing and executing complex computations. The approach not only simplifies the development of high-performance computing systems but also enhances their efficiency and scalability, making them suitable for a wide range of applications, from scientific simulations to artificial intelligence.

Figure 4B:
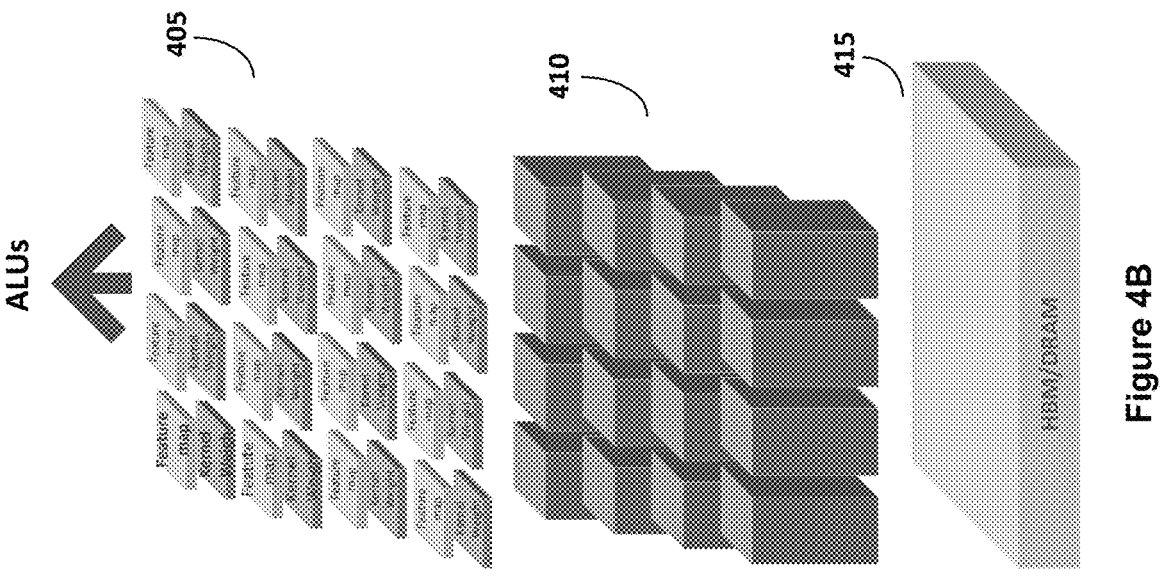
FIG. 4B illustrates a streamlined memory hierarchy for current processing and streamlined memory structure in Data Flow Processing Units, in accordance with an embodiment of the present invention.

FIG. 4B illustrates a streamlined memory hierarchy for current processing and streamlined memory structure in Data Flow Processing Units. The design focuses on minimizing complexity and energy consumption for specific tasks.

The components in the memory structure in Data Flow Processing Units (DFPU) are as follows:

Thin Registers 405: In contrast to the traditional processor, the current processing unit includes, without limitation, multiple cores of DFPU (Data Flow Processor Unit). Each core may comprise, without limitation, an SRAM and a register space allocated for weights, as well as a separate register space designated for features. These cores collectively utilize a shared interface, such as an HBM or DRAM controller, facilitating access to external memory. The current processing unit employs a much smaller number of registers, which are further subdivided into two sets. One set of registers may be optimized to hold data, while the other set of registers may be specialized for holding weights. In some special cases, the registers may also be used to hold two different data tensors. The specialized registers are designed for executing simple and targeted tasks, reducing overhead and complexity.

Near Memory (SRAM or Embedded Memory) 410: The near memory in the contemporary setup may be composed of SRAM (Static Random-Access Memory) or embedded memory. SRAM may be faster but less dense than DRAM and may be suitable for caching frequently accessed data. Embedded memory may be integrated into the processor and may be optimized for specific applications.

Interface to DRAM or HBM: Just like in the traditional processor, there is still a connection to external memory, which may be DRAM or HBM 415. External memory DRAM or HBM 415 may serve as a larger repository for data and instructions that may not fit in the streamlined memory structure. The interface to the DRAM controller or HBM controller can either be a single channel or multiple channels which ensures data may be efficiently transferred between the processor and the external memory.

Figure 4A:
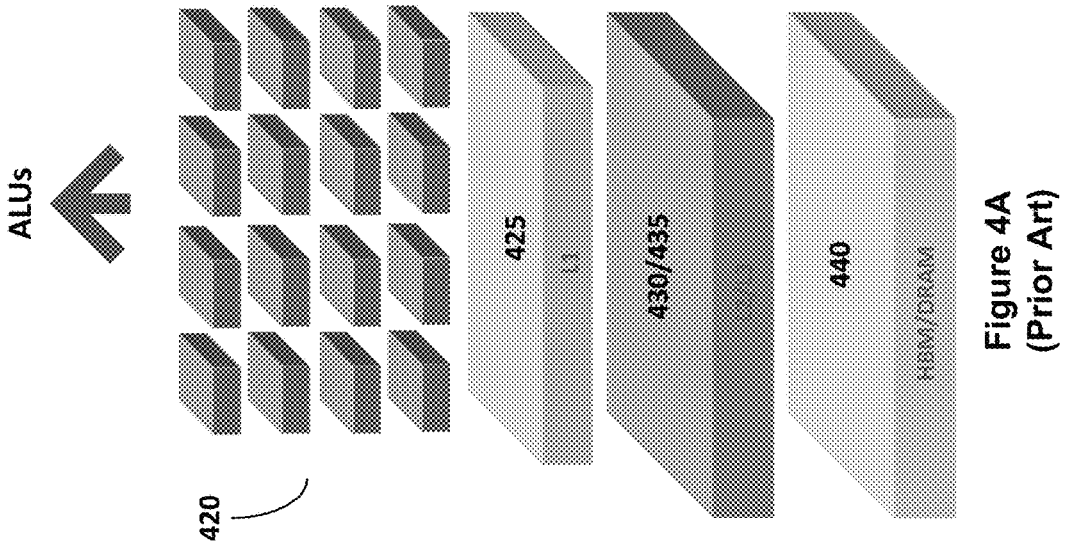
FIG. 4A illustrates a traditional memory hierarchy in typical processors.

The side-by-side comparison in FIG. 4A and FIG. 4B highlights the trade-offs between traditional and modern memory hierarchies, balancing the need for fast and efficient processing with the demands for simplicity, power efficiency, and specialization in contemporary processing units.

Figure 5:
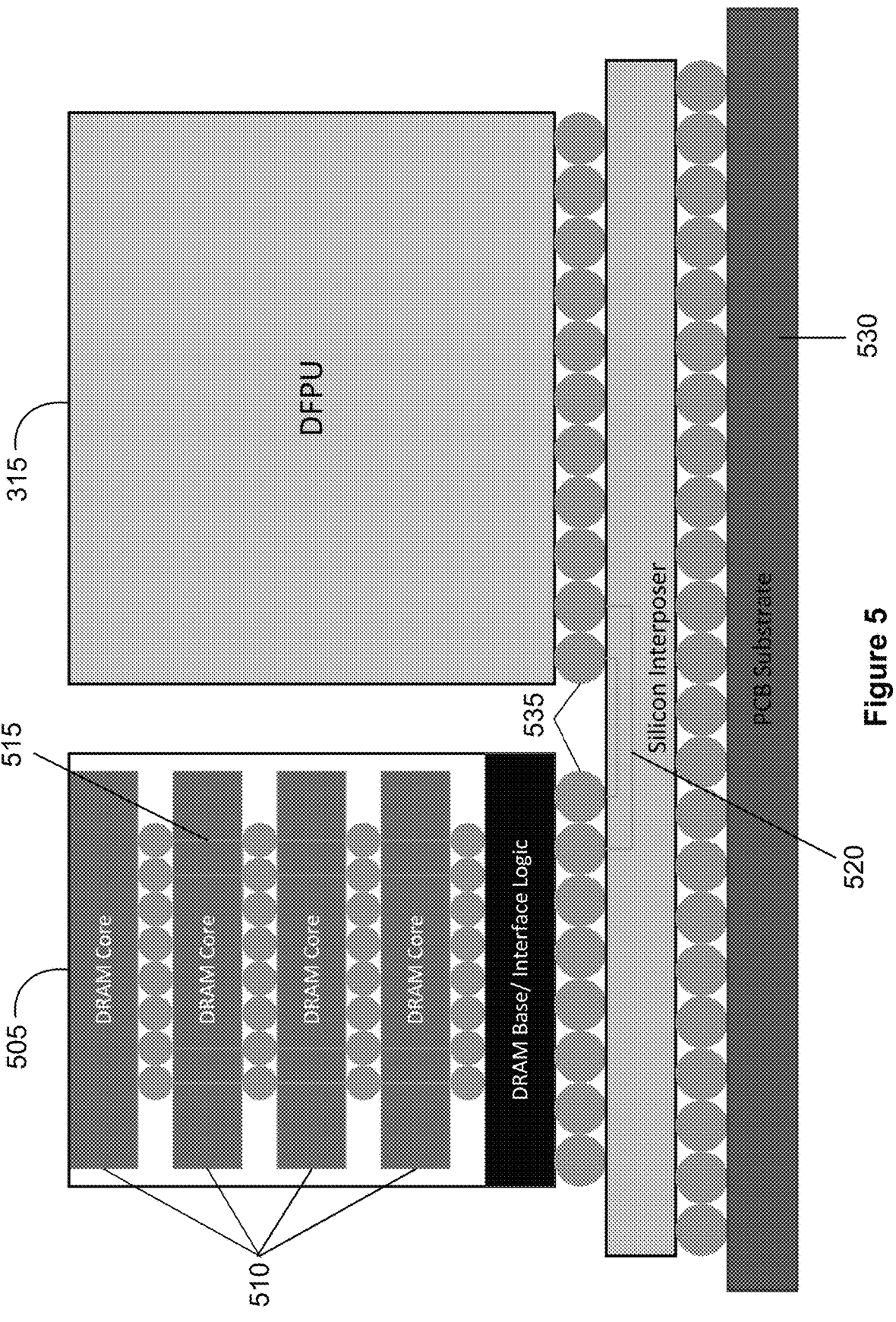
FIG. 5 illustrates an exemplary High Bandwidth Memory for high-performance applications, in accordance with an embodiment of the present invention.

FIG. 5 illustrates an exemplary High Bandwidth Memory (HBM) for high-performance applications, in accordance with an embodiment of the present invention. In an embodiment of the present invention, HBM 505 is an advanced type of memory technology designed for high-performance applications which connects to Data Flow Processor Unit (DFPU) 315. HBM 505 uses a 3D stacked memory architecture to achieve higher memory bandwidth and lower power consumption compared to traditional memory technologies.

Through Silicon Via (TSV) 515 is a method for vertically connecting multiple semiconductor's dies or layers by creating small vias or vertical interconnections that pass through the silicon substrate. TSV technology enables efficient and high-speed communication between different layers or dies in a 3D stack.

HBM 505 utilizes TSV 515 technology to stack and connect multiple DRAM cores 510 on a single package. The DRAM cores are vertically aligned and connected through TSVs 515, allowing for efficient data transfer and a significant increase in memory bandwidth.

Silicon interposer 520 is a passive integrated circuit that serves as an intermediary between DFPU die 315 and HBM stack 505. Silicon interposer 525 provides the necessary routing for high-speed data connections, facilitating communication between the processor/DFPU 315 and memory stack/HVM 505. The silicon interposer may have a complex network of interconnections 535 that ensure efficient data transfer and electrical connectivity between the components. A ball grid array (BGA) 535 is a type of surface-mount packaging (a chip carrier) used for integrated circuits. In some embodiments, Chip-on-Wafer-on-Substrate (COWOS) utilizes microbumps 535 as interconnects to securely mount High Bandwidth Memory (HBM) 505 and Data Flow Processor Unit (DFPU) 315.

Once DFPU die 315 and HBM stack 505 are connected through silicon interposer 520, the entire assembly may be mounted onto a PCB substrate 530. PCB Substrate 530 acts as the main circuit board for the overall system, connecting other components, such as power management, I/O connectors, and other critical elements. The arrangement allows for a high-performance memory subsystem by packing multiple DRAM cores 510 in a 3D stack and efficiently connecting them to DFPU 315 through silicon interposer 520. The design enhances memory bandwidth and overall system performance, making it suitable for applications that demand significant computational power, such as high-end graphics processing, artificial intelligence (AI), and scientific computing.

Figure 6A:
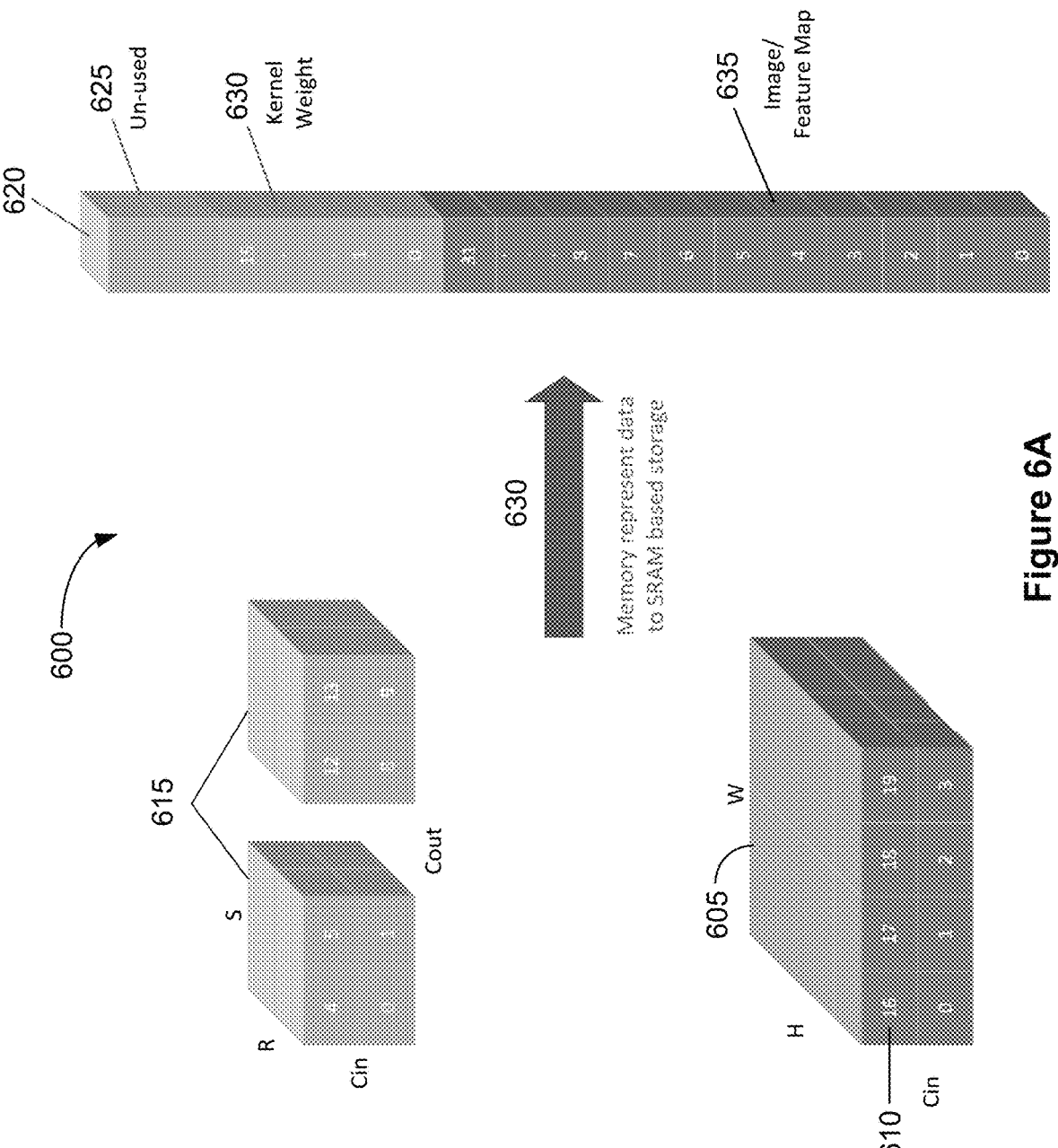
FIG. 6A is an illustration of an exemplary data structure remapping transformation diagram, in accordance with an embodiment of the present invention.

FIG. 6A is an illustration of an exemplary Data Flow process including, without limitation, memory storage in DRAM, SRAM or non-volatile memory 600, in accordance with an embodiment of the present invention. A feature map 605 may be characterized by its dimensions (H, W, Cin). The feature map may be divided into blocks 610, with the example in the case being a block size of (H/4, W/4, Cin/2). Block sizes are tailored to accommodate the block's compression and decompression capabilities. The block sizes may be set to values like 8×8×8 array or any other suitable size as needed. The block sizes also take into account the resources like registers, buffers, and processing power available in the core. The compressed data, whether a subset of the input data or feature map 605, is loaded (shown as arrow 630) into SRAM 620 at a feature map address 635. Model weights 615, which may be either the complete set or a portion of the weights. In the specific example, the weight dimensions are represented as (Cout, R, S, Cin), and the weight block size is (Cout/2, R/2, S/2, Cin/2). Weight blocks 615 are loaded (shown as arrow 630) into SRAM bank 620 but are allocated at different addresses such as, without limitation, weight block address 630. There might also be some empty or unused blocks 625 within SRAM bank 620.

Figure 6B:
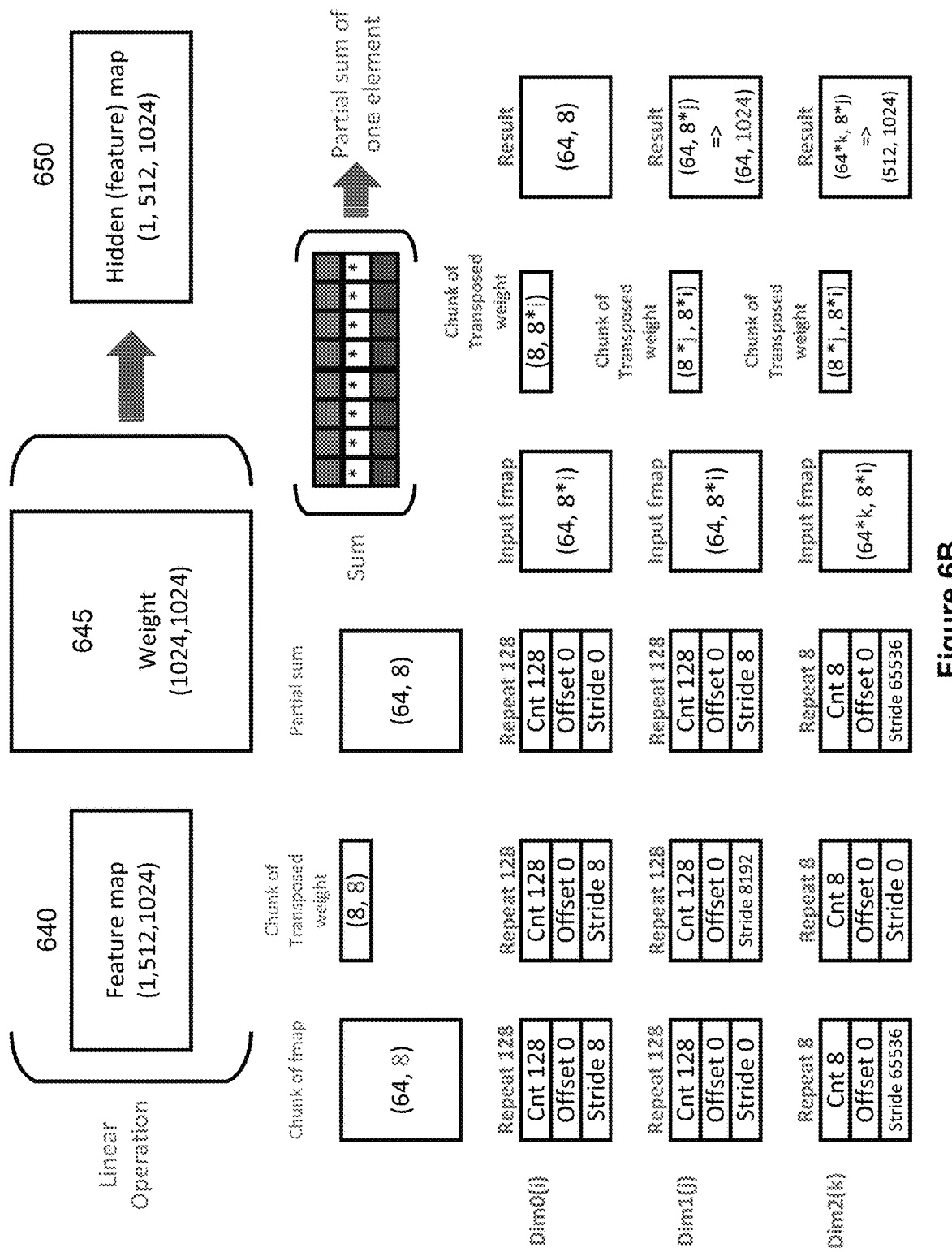
FIG. 6B is an illustration of an exemplary feature/weight data transformation diagram involving a Linear Operation of a Feature Map Data Flow, in accordance with an embodiment of the present invention.

FIG. 6B is an illustration of an exemplary feature/weight data transformation diagram involving a Linear Operation of a Feature Map Data Flow, in accordance with an embodiment of the present invention. In one embodiment of the present invention discloses a system involving a Linear Operation of a Feature Map (1,512,1024) 640 and corresponding weights (1024, 1024) 645. The outcome is an output Hidden Map 650 or final output with dimensions (1, 512, 1024). Considering the constrained resources of the Neural Processing Unit (NPU), a segment of the feature map (fmap) measuring (64,8) and a chunk of transposed weights sized (8,8) are selectively fetched. Subsequently, the execution unit processes these segments, yielding a partial sum of size (64,8). Previously, a matrix multiplication involving a feature map chunk (64,8) and a transposed weight chunk (8,8) was performed. The multiplication operation entails elementwise multiplication, where each row of the feature map is multiplied elementwise with the corresponding column of the weight chunk (8, 8). The results are then summed to produce an output matrix with dimensions (64,8). The overall size of the resulting output is (64,8).

Specifically, considering a feature map chunk with dimensions (64, 8) and a transposed weight chunk with dimensions (8, 8), elementwise multiplication on the columns of the transposed weight was conducted. This simplification in design enhances the efficiency of the system. The weights can be managed using either broadcasting or a pipeline technique, both of which are seamlessly integrated into our methodology.

To obtain the complete result with dimensions (64,8), it is imperative to process the entire length of 1024, akin to an iterative process along the dim0 dimension.

Dim0 functions as an 'i' loop, concentrating on the retrieval and execution of the remaining dimension of 1024. This yields a partial result of (64,8) at each iteration. Dim1 operates as a 'j' loop, extending the result to (64, 1024), while Dim2, functioning as a 'k' loop, further extends the result to (512, 1024). In this example, the offset is set to zero, and the address is calculated based on this offset, encompassing the entire tensor in a single instruction (counter, offset, stride).

For the dimension 0 (dim0), the stride is set at 8 to correspond with the 'i' loop, where the address of each chunk changes by 8 in each iteration. Both the input feature map and weight require an increment of 8 for the next chunk, resulting in the accumulation of a partial sum at a consistent location.

In Dim1, the 'j' loop repeats the process of Dim0 at each step, utilizing the feature map from Dim0 while fetching the next weight with a stride of 8192. The output stride remains 8.

In Dim2, each step involves looping through the entire Dim1, and at each step of Dim1, looping through the entirety of Dim0. Dim2 necessitates the continuous retrieval of the next feature map with a stride of 65536 (64×1024), using the same weights from Dim1. The output stride also remains 65536.

This description illustrates a simplified instance of the Data Flow Processor. The processor includes an L1 input buffer for the feature map and an L1 Kernel buffer for weights. While the technical details of the buffers are intricate, the fundamental concept involves employing multidimensional loops to control the data flow of the processor, which is integral to the scope of our invention.

The size of feature map or weight chunks is adaptable. The preceding description aims to elucidate the innovation, and it is important to note that the chunk size is not confined to the dimensions specified earlier.

Figure 7:
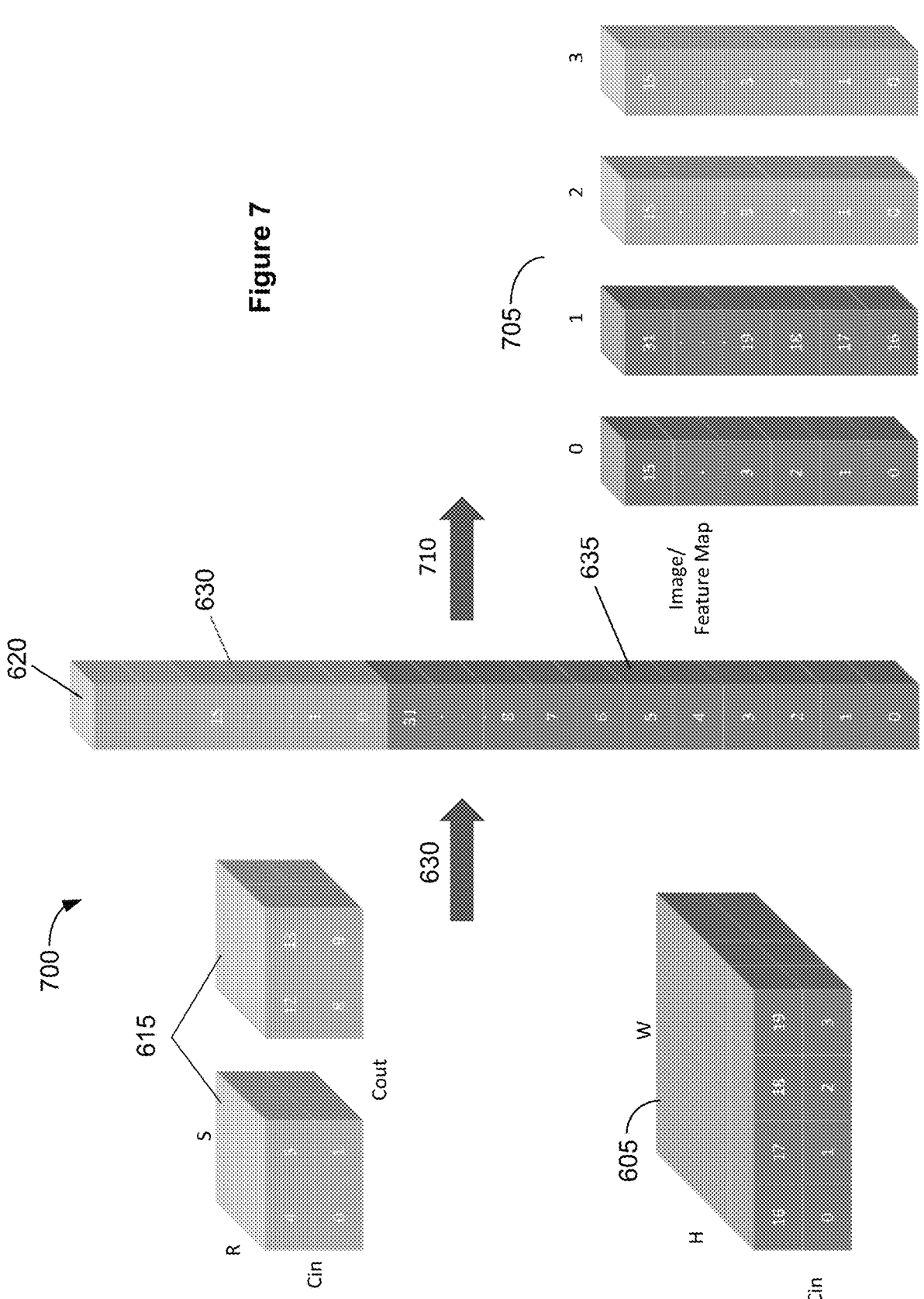
FIG. 7 is an illustration of an exemplary Data Flow process, in accordance with an embodiment of the present invention.

FIG. 7 is an illustration of an exemplary Data Flow process 700, in accordance with an embodiment of the present invention. In one embodiment of the present invention, process 700 is similar to process 600 but utilizing multiple banks 705 to increase the number of Read/Write ports. In the figure, feature map 605 may be loaded (shown as arrow 710) into both bank 0 and bank 1, while weights 615 are loaded into bank 2, and bank 3 is unused. It's worth noting that feature map 605 and weights 615 may also be loaded into the same bank if needed.

FIG. 8 is an overview of an exemplary Python® function for performing a convolution 805 and a Python® function for matrix multiplication 810, in accordance with an embodiment of the present invention.

Convolution Operation 805:

In some embodiment of the present invention, software product code 800 defines a Python® function named Convolution 805 that performs a 2D convolution operation on an input tensor and a filter (or weight) tensor using the PyTorch™ library. The function takes two parameters: input (representing the input data) and weight (representing the convolutional filter). The data and weights may be viewed as tensors and aimed to process AI layers through high-level graphs. An approach that may enable bypassing the tedious assembly-level development that may save energy and time.

Convolution operation 805 first extracts important dimensions from the input and weight tensors: H and W represent the height and width of the input tensor, IC_input and IC are the input channel dimensions of the input and weight tensors, and OC, R, and S represent the number of output channels, filter height, and filter width, respectively.

A new tensor named Output is initialized using torch.zeros( ). The tensor may be intended to store the result of the convolution operation and has dimensions (H-R+1, W-S+1, OC). The code includes an assertion to verify that the input channel dimension of the input tensor (IC_input) matches the input channel dimension of the weight tensor (IC). This ensures that the convolution operation is compatible. The core of the convolution operation may be implemented using nested loops. The loops iterate over the output dimensions (y, x, p), filter dimensions (r, s), and input channel dimension q.

Within the innermost loop, software product code 800 may perform element-wise multiplication between the input data, input[y+r][x+s][q], and the corresponding filter element, weight[p][r][s][q]. The results are accumulated in the Output tensor at the corresponding location (y, x, p). Finally, the function may return the Output tensor, which contains the result of the 2D convolution operation.

Matrix Multiplication:

Software product code 800 is a Python® function for performing matrix multiplication 810 between two matrices represented as NumPy™ arrays (or similar structures). The function takes two matrices MatA and MatB as input and returns the result of their matrix multiplication.

A step-by-step explanation of the code is as follows:

M, PA=MatA.shape and P, N=MatB.shape: The lines extract the dimensions of the two input matrices MatA and MatB. MatA has dimensions M×PA, and MatB has dimensions P×N.

assert PA==P: The line checks if the number of columns in MatA (PA) matches the number of rows in MatB (P). This may be a necessary condition for matrix multiplication to be valid. If the condition is not met, an error may be raised.

result=torch.zeros((M, N)): A result matrix result may be initialized with zeros. The matrix may eventually store the result of the matrix multiplication and has dimensions M×N.

The following nested loops are used for matrix multiplication:

for i in range(M): The loop iterates through each row of MatA.

for j in range(N): The loop iterates through each column of MatB.

for k in range(P): The loop iterates through each item value in the range of the common dimension between MatA and MatB (common dimension P).

result[i, j]+=MatA[i, k]*MatB[k, j]: Inside the nested loops, the code performs the actual matrix multiplication. It multiplies the corresponding elements from MatA[i, k] and MatB[k, j] and accumulates the result in the corresponding location of the result matrix (result[i, j]). This may be done for all possible combinations of rows from MatA, columns from MatB, and the shared dimension P. Finally, the result matrix, which now contains the result of the matrix multiplication, is returned.

The software product code follows the standard algorithm for matrix multiplication, and it may be a straightforward implementation. It's important to ensure that the input matrices have the correct dimensions for matrix multiplication, as checked by the assert statement. Also, keep in mind that the code assumes that MatA and MatB are NumPy arrays or similar data structures.

Figures 9A, 9B:
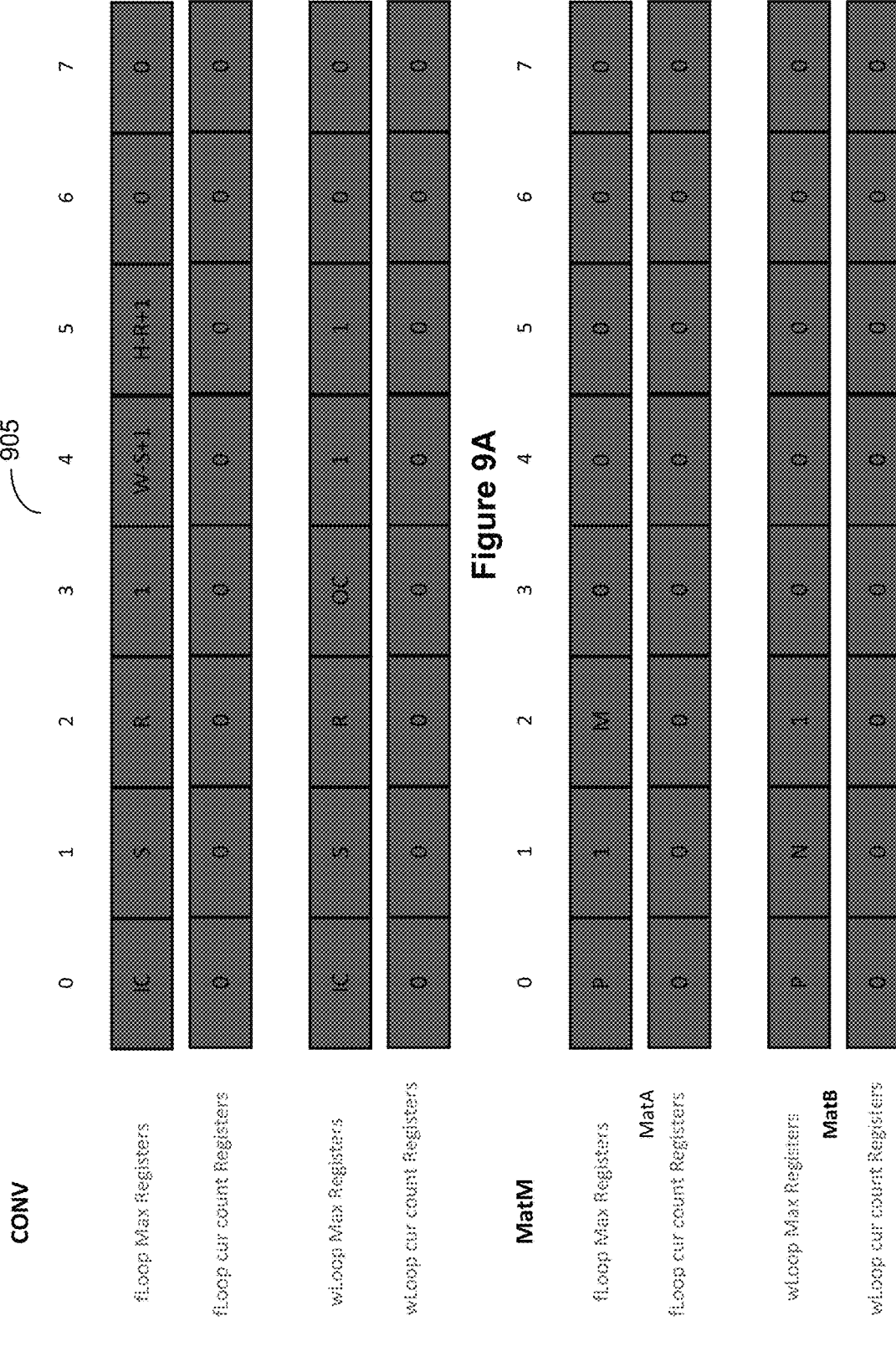
FIG. 9A is an illustration of an exemplary hardware count registers for accommodating convolution loop statements, in accordance with an embodiment of the present invention.
FIG. 9B is an illustration of an exemplary hardware count registers for accommodating matrix multiplication loop statements, in accordance with an embodiment of the present invention.

FIGS. 9A-9B are illustrations of exemplary hardware count registers 905 for accommodating CONV and MatM loop statements respectively, in accordance with an embodiment of the present invention. Referring to FIGS. 8 and 9A, CONV case 805 is depicted, comprising of nested loops for iterative computation. Here's a breakdown of the loops:

The dim5 loop iterates over the y-coordinate within the range from 0 to (H–R+1). This loop controls the vertical movement across the output tensor.

The dim4 loop iterates over the x-coordinate within the range from 0 to (W–S+1). This loop controls the horizontal movement across the output tensor.

The dim3 loop iterates over the output channels (OC). This loop allows processing of each output channel independently.

The dim2 loop iterates over the rows (r) of the filter/kernel within its height (R). This loop moves vertically across the filter.

The dim1 loop iterates over the columns(s) of the filter/kernel within its width(S). This loop moves horizontally across the filter.

The dim0, innermost loop iterates over the input channels (IC). This loop enables processing of each input channel independently.

Within these nested loops, the architecture computes the output value at position [y][x][p] by performing a weighted sum of the input values and corresponding filter weights. Specifically, it multiplies each input value (input[y+r][x+s][q]) by the corresponding weight (weight[p][r][s][q]) and accumulates the results into the output tensor (Output[y][x][p]). This process is repeated for every combination of input, weight, and output channel across all positions within the output tensor.

Referring to FIGS. 8 and 9B, Matrix Multiplication 810 is depicted. It involves nested loops as follows:

The dim2 loop iterates over the rows (i) of Matrix A, ranging from 0 to M–1.

The dim1 loop iterates over the columns (j) of Matrix B, ranging from 0 to N–1.

The dim0, innermost loop iterates over the range of P, which represents the number of items/values per row in Matrix A or per column in Matrix B.

Within these nested loops, the algorithm calculates the result matrix by performing a series of multiplications and additions. Specifically, for each combination of row (i) and column (j), it iterates over the items in the corresponding row of Matrix A (indexed by k) and the items in the corresponding column of Matrix B (also indexed by k). It multiplies each pair of corresponding items (MatA[i,k] and MatB[k,j]) and accumulates the results to compute the value of result[i,j]. This process is repeated for every element of the resulting matrix.

Referring to FIGS. 8 and 9A-9B, a straightforward multiple-loop statement is presented. The method is provided for translating the loop into hardware count registers 905, with a focus on optimizing registers 905 for parallel computing. Additionally, the mapping is extended to higher-dimensional ALUs, multiple cores, multiple chips, and multiple systems.

In FIGS. 9A-9B, the concept of the counter register to keep track of the iterations in each dimension is shown. While the processing unit can operate on a single pixel, this approach may not be efficient for AI acceleration, especially considering that data is typically multidimensional.

Figure 10:
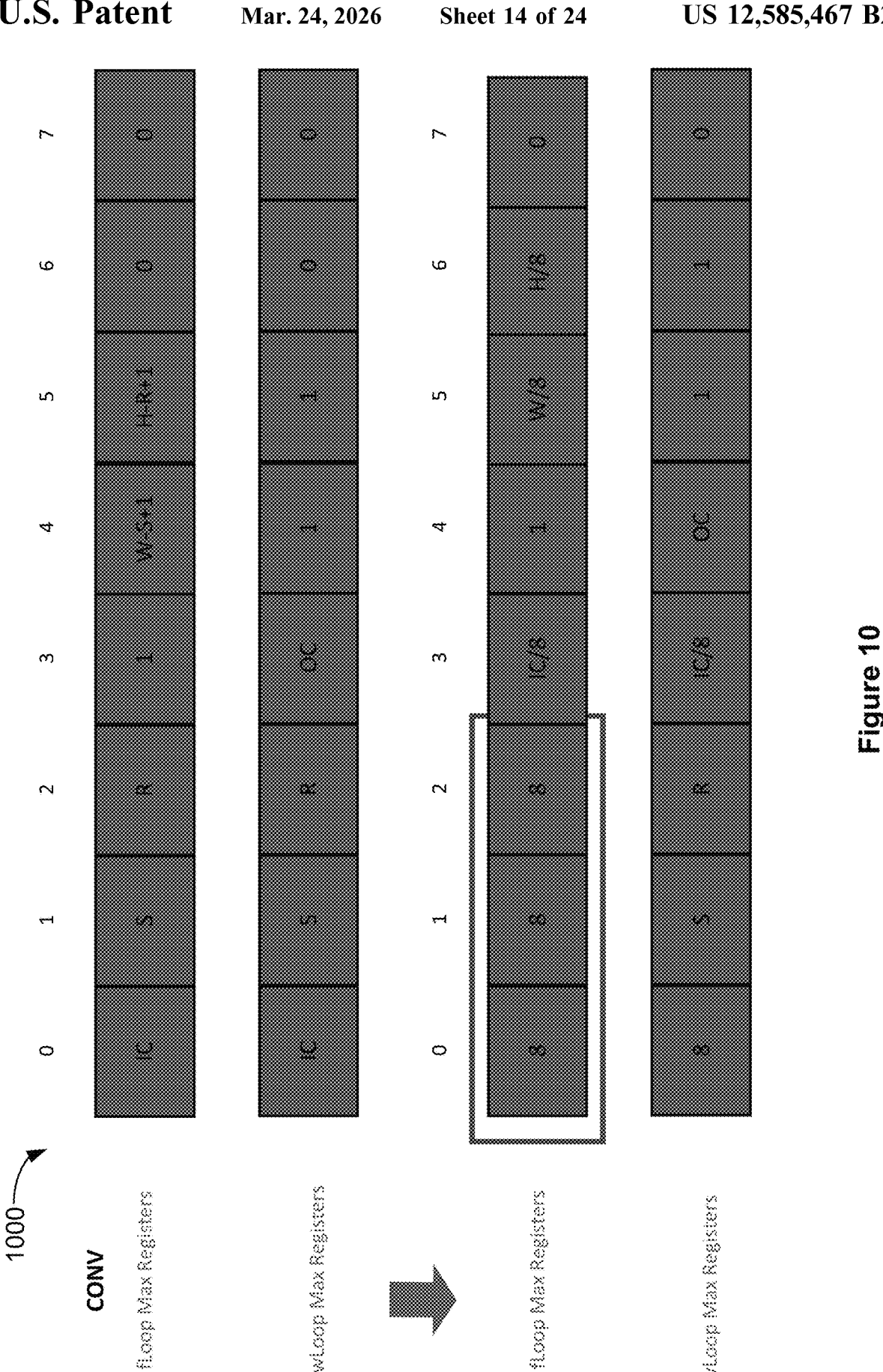
FIG. 10 is an illustration of an exemplary mapping loop statements to hardware counter sets, in accordance with an embodiment of the present invention.
Figure 11:
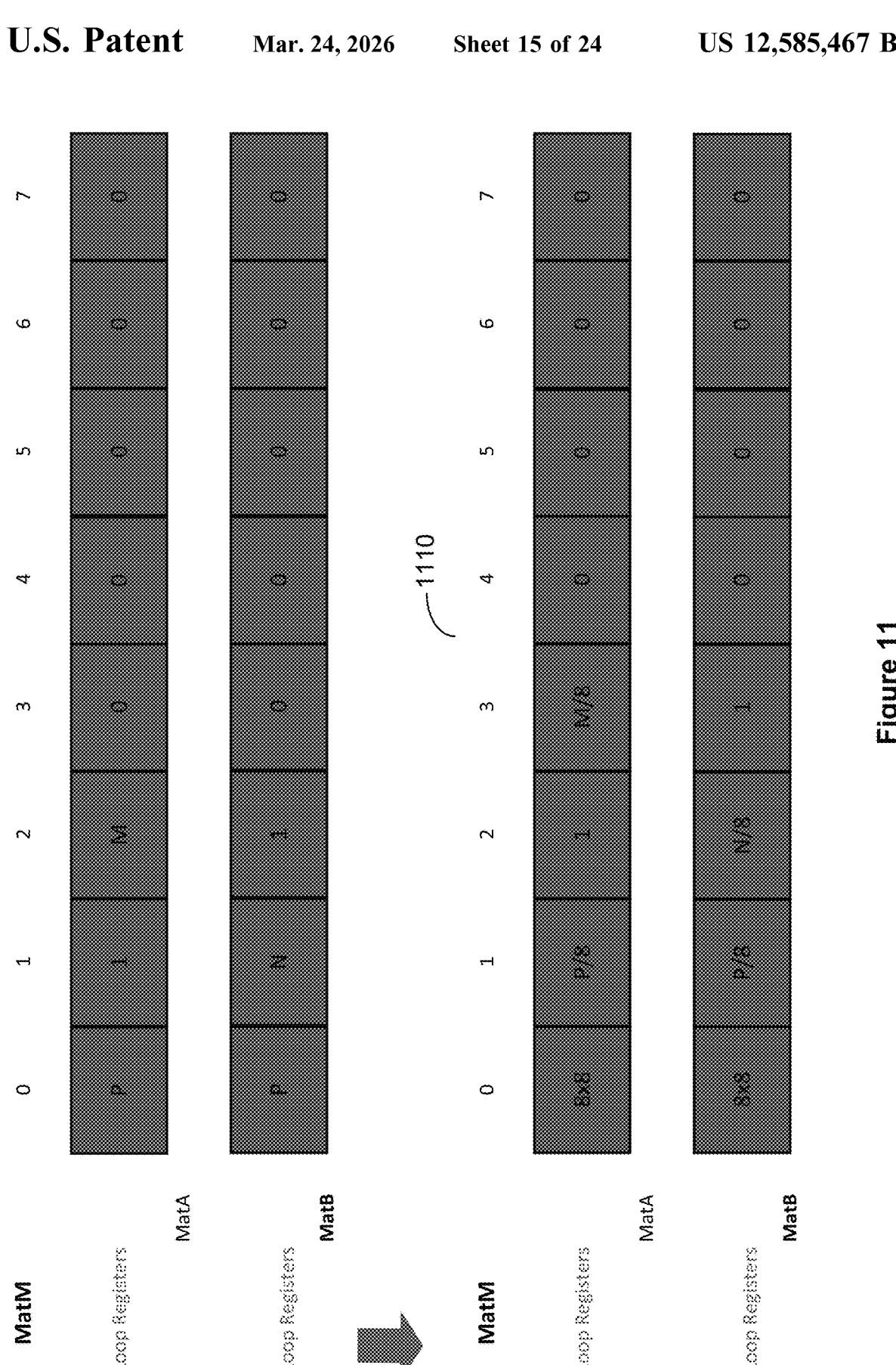
FIG. 11 illustrates the use of block level (H, W, Cin)=(8, 8, 8) in mapping loop statements to hardware counter sets, in accordance with an embodiment of the present invention.

In FIGS. 10-11, parallel processing of multiple data points simultaneously is illustrated. Similar to the approach depicted in FIG. 6B, data in chunks, along with corresponding weights, produce chunked tensors as outputs. This parallel processing allows for more efficient computation and acceleration of AI tasks, taking into account the multi-dimensional nature of the data.

FIG. 10 is an illustration of an exemplary mapping loop statements to hardware counter sets 1000 in a convolution operation, in accordance with an embodiment of the present invention. Referring to FIGS. 8 and 10, in the context of the Convolution function 805, six loop statements may be encountered, resulting in six-dimensional counters when translated to hardware. To address the complexity, begin with the inner loops before moving to the outer loops. Within the fLoop Pair Registers, the first inner loop "q" ranges from 0 to IC, with the first-dimension counter's maximum value set at IC, and the initial value of the first-dimension current count register is 0. Following that, map the second inner loop "s" from 0 to S, with the second-dimension counter having a maximum value of S, and the corresponding current count register set to 0. The process continues with the third inner loop "r," ranging from 0 to R, and map the third-dimension counter with a maximum value of R, setting the current counter to 0. The fourth inner loop "p" ranges from 0 to OC, and since the feature map lacks an output channel, simply count to 1. Then map the fourth-dimension counter with a maximum value of OC, and the current counter remains at 0. Furthermore, map the "x" and "y" loops, ranging from 0 to W−S+1 and 0 to H−R+1, into fifth- and sixth-dimension counters, with maximum values of W−S+1 and H−R+1, and corresponding current count registers set to 0 and 0. Apply the same mapping scheme to the wLoop Max Registers, mapping the first dimension to the fourth dimension (IC, S, R, OC) and setting the current counts to 0, 0, 0, 0. Since the weights do not possess a fifth and sixth dimension, simply set the maximum values of the fifth and sixth dimensions to 1 and 1, with the current count registers also set to 0 and 0.

Numerous alternative approaches are available for mapping the loop into registers. For instance, a single max register may be used and count down to 0, obviating the need for a pair of max and current count registers. The value mapping may be modified and the order of the six dimensions of the loop may be changed, or consolidate the six dimensions into fewer dimensions. All The techniques represent various implementation strategies while maintaining the same core concept and invention.

Referring to FIG. 10 and FIG. 11, at a bottom 1110 of FIG. 11, apply the same scheme to map the Matrix Multiplication loop into fLoop Max Registers, fLoop Cur Count Registers, wLoop Max Registers, and wLoop Cur Count Registers. This enables us to obtain values for the fLoop Max Register's first to third dimensions (P, 1, M) and the wLoop Max Registers' values (P, N, 1). Furthermore, block size level is used to do the Loop. A (H, W, Cin)=(8, 8, 8) may be used as an example, without limitation. The fLoop Max Registers and wLoop Max Registers may reshape from 6 dimensions to 7 dimensions just similar to reshape function in Pytorch™ or Numpy™.

FIG. 11 illustrates the use of block level (H, W, Cin)=(8, 8, 8) in mapping loop statements to hardware counter sets, in accordance with an embodiment of the present invention. fLoop Max Registers may be reshaped into a new format 1110. Feature map basic size is 8×8×8. The fourth dimension may be the IC (input channel) divided by 8. The value of fifth dimension may just copy from the original value of the fourth dimension. That is, there are no output channel in the feature map. Then, the value of sixth dimension may be total Width divide by 8, assuming to handle the padding in the hardware. The same, calculate the seventh dimension as total Height divide by 8. The original S and R of the fLoop Max Registers may just handle by wLoop Max Registers. A synchronized scheme between Feature map and Weight may be needed. For the weight, the input channel divide by 8. The first dimension, put the value 8, then keep the second and third dimension the same as S and R. Then fourth dimension, put Input channel divide by 8. Then the fifth, sixth and seventh dimension copied from the values of original fourth, fifth and sixth dimension. The method is very similar to the reshape function in Torch™ or Numpy™. With the changes above, it is more like a parallel computing in a core. Use the same method to reshape the loop and distribute the task to many cores, many chips or many systems. Regarding many cores, chips and systems, for example, use the same method for multiple dimensions computing in the same core as well. Reshape feature map and weights by using different size, different dimension or merge the dimensions and do a synchronous between the two inputs: feature map and weights.

Additionally, a block-size approach may be employed to manage the loops. For example, without limitation, take (H, W, Cin)=(8, 8, 8). The fLoop Max Registers and wLoop Max Registers may undergo a transformation from 6 dimensions to 7 dimensions, much like the reshape function found in libraries such as PyTorch™ or NumPy™.

With adjustments, the execution becomes more akin to parallel computing within a core. The approach may allow the same technique to be applied to reshaping the loops and distributing tasks across multiple cores, chips, or systems. A more detailed information on handling multiple cores, chips, and systems in subsequent sections may be provided. It's important to note that the example serves as a simplified demonstration, and the same method may be utilized for multi-dimensional computations within the same core. Furthermore, feature maps and weights may be reshaped to use different sizes, dimensions, or combinations, establishing synchronization between the two inputs: feature maps and weights.

Figure 12A:
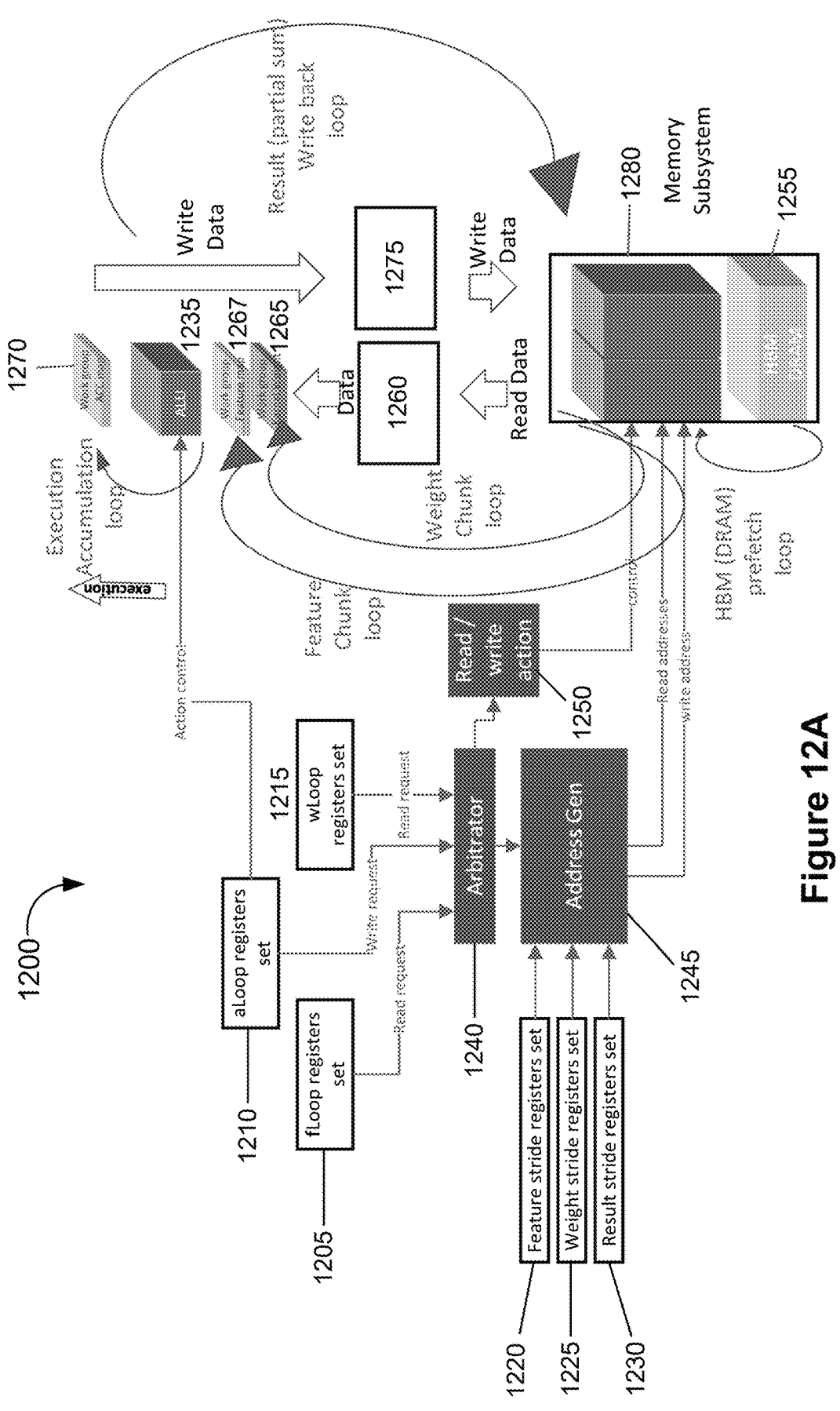
FIG. 12A is an illustration of an exemplary overview of a Data Flow system, in accordance with an embodiment of the present invention.

FIG. 12A is an illustration of an exemplary overview of a Data Flow system 1200, a block level of a DFPU architecture, in accordance with an embodiment of the present invention. In an embodiment of the present invention, Data Flow system 1200, features, without limitation, three sets of loop registers: namely, "fLoop registers set 1205" for feature loops across multiple dimensions, the "wLoop registers set 1215" for weight loops across multiple dimensions, and "aLoop registers set 1210" for controlling ALU actions, encompassing action type, action direction, and result write-back. The loop registers play a pivotal role in coordinating various aspects of the system.

"fLoop registers set 1205" may be associated with Feature stride registers 1220 to determine address strides for each count and dimension. The registers, in conjunction with Feature stride registers 1220, help specify the locations of features in multiple dimensions, across multiple cores, chips, or systems.

For weights, "wLoop registers set 1215" may serve as weight loop count registers for multiple dimensions. The set works in tandem with Weight stride registers 1225 to define locations within multiple addresses in a DFPU core. In the diagram, one of the core is shown. The address could point to the other DFPU core(s) and fetch from or store to the other core, across different cores, chips, or systems.

"aLoop registers set 1210" may control ALU 1235 actions, including action type, action direction, and result write-back. The result write-back may be associated with Result stride registers 1230, specifying addresses across multiple dimensions.

Requests from "fLoop registers set 1205," "wLoop registers set 1215," and "aLoop registers set 1210" are sent to an arbitrator 1240. The arbitrator may determine whether to initiate read requests for feature maps or weights or write requests for results and may communicate the information to an Address Generation module 1245, which generates read and write addresses and sends control signals to the read/write action block 1250.

Read/write action block 1250 may manage the SRAM for reading or writing across different, various, and/or multiple memory banks. Address Generation 1245 may provide read and write addresses to memory subsystem 1280, which includes SRAM and HBM/DRAM 1255. Memory subsystem 1280 either sends Read Data or receives Write Data. The Read Data may be processed through the "Block level Decompress or Block Decompression Logic device 1260" to decompress into data, which is then stored in registers "Work group of Feature map 1267" or "Work group of Kernel Weight 1265."

The "aLoop" may control the type and direction of ALU actions. The ALU itself is a multi-dimensional adder tree group. In each action, temporal data may accumulate in the "Work group of ACC map 1270." After several loops controlled by the "aLoop registers set," the accumulated ACC result may be written back to "Block Level Compress or Block Compression Logic device 1275." After compression, the data may be written to memory subsystem 1280. In some embodiments, compression and decompression are optional components in the system. In other embodiments, an Advanced Encryption Standard (AES) function may be incorporated for robust key management and providing enhanced security for the storage of weights. The function may ensure the protection of sensitive weight data and enhances the processor's high-dimensional computing capabilities, optimizing data retrieval, synchronization, execution, and storage processes while maintaining data security. For example, the Advanced Encryption Standard (AES) is an algorithm that uses the same key to encrypt and decrypt protected data, such as weight data. Instead of a single round of encryption, data is put through several rounds of substitution, transposition, and mixing to make it harder to compromise.

Additionally, it's worth mentioning that "fLoop registers set 1205," "wLoop registers set 1215," and "aLoop registers set 1210" may be renamed or combined into larger register sets or separated into smaller ones while still staying within the scope of the invention. The simplified example is provided for a better understanding of the invention, but the actual system is expected to be much more complex than the description presented here.

Figure 12B:
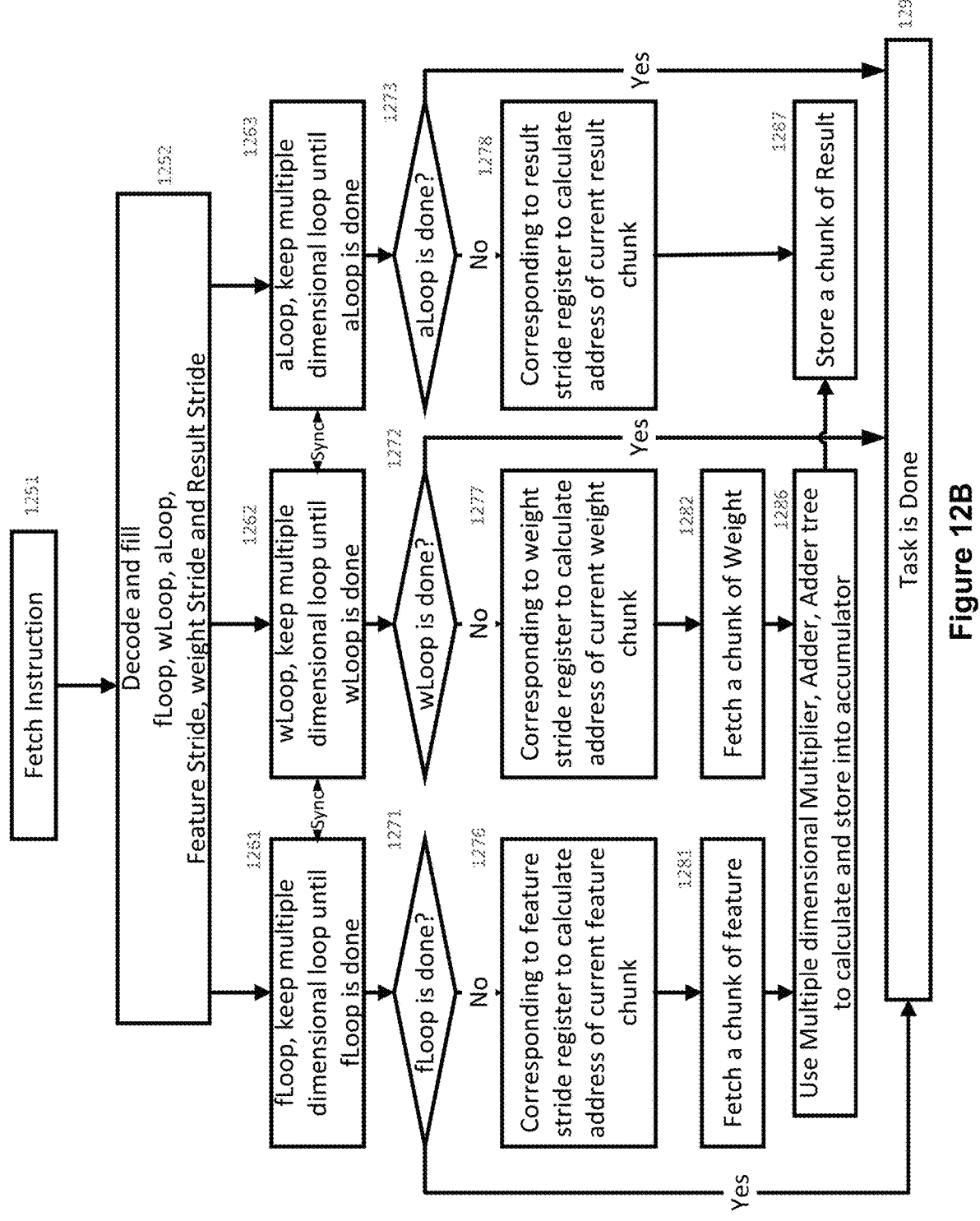
FIG. 12B is an illustration of an exemplary flowchart of a Data Flow system process, in accordance with an embodiment of the present invention.

FIG. 12B is an illustration of an exemplary flowchart of a Data Flow system process, in accordance with an embodiment of the present invention. In one embodiment of the present invention, in a Step 1251, Fetch instruction goes to Decode and Fill fLoop, wLoop, aLoop, Feature Stride, weight Stride and Result Stride in a Step 1252. The process then goes to Steps 1261, 1262 and 1263. In Step 1261, fLoop keeps multiple dimensional loop until fLoop is done. In Step 1262, wLoop keeps multiple dimensional loop until wLoop is done. In Step 1263, aLoop keeps multiple dimensional loop until aLoop is done. Between Steps 1261, 1262 and 1263, these three blocks will sync for the operation. Then Step 1261 moves to Step 1271, Step 1262 to Step 1272, and Step 1263 to Step 1273. In Steps 1271-1273, check logic checks whether their respective loop is done. If the loop is done, the system goes to the end, which is Task is done in a Step 1290. If the loop is not done, the system will go to the next step, Steps 1276, 1277, 1278, where the address of a feature chunk may be calculated based on the corresponding stride register. Feature, Weight and Result use the same formula of calculation. Then Step 1276 moves to Step 1281, 1277 moves to Step 1282, and 1278 moves to Step 1287. In Steps 1281 and 1282, for the feature and weights, a chunk of data is fetched and stored in feature and weight registers. Then, the system starts to process according to the Op code in a Step 1286. The operation could be, for example without limitation, multiply, adder, adder tree operations, etc. The temporary partial result may then be stored in accumulators. When the accumulation is done, the result may be written out in a Step 1287.

Figure 13A:
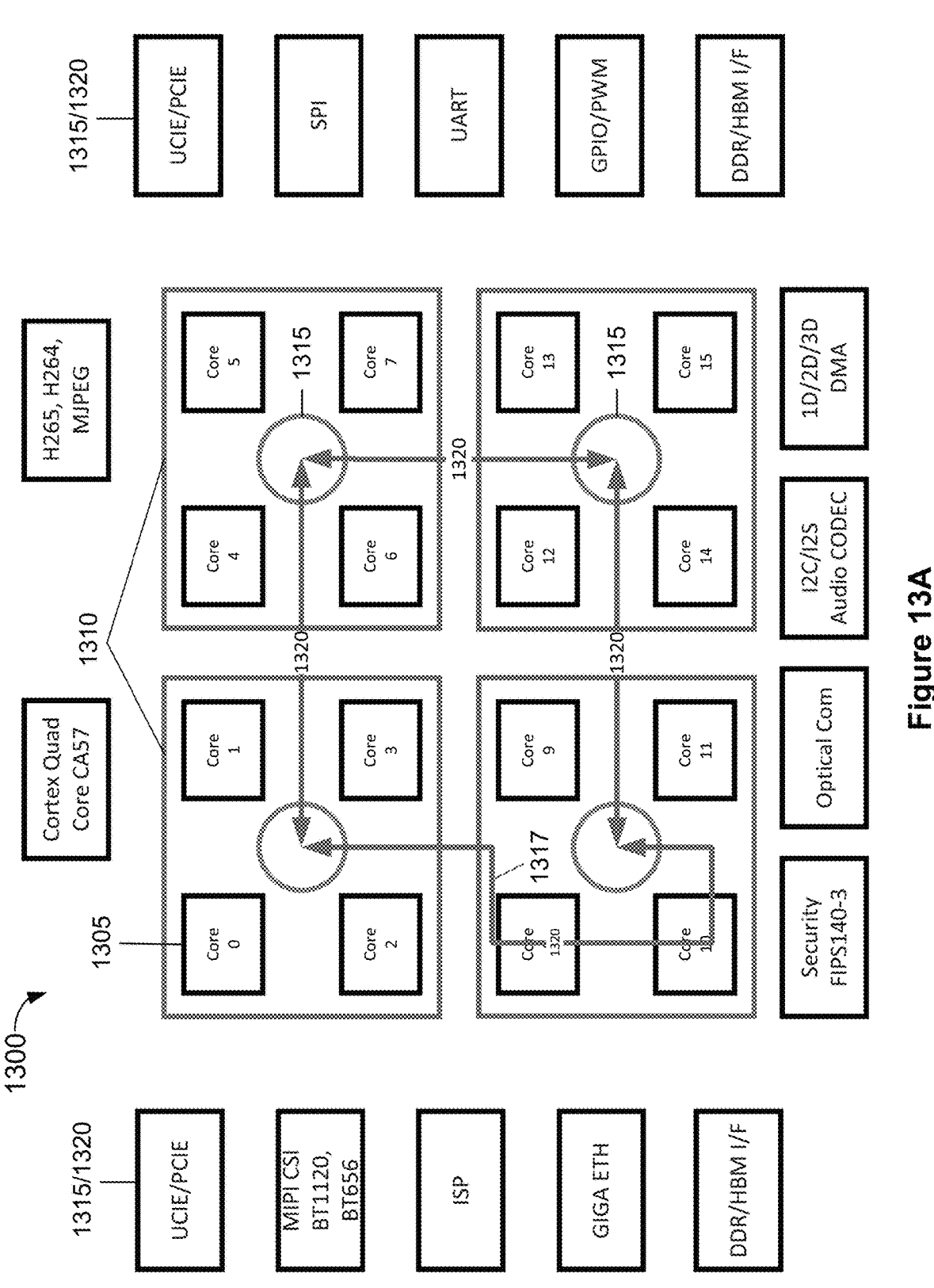
FIGS. 13A and 13B are illustrations of an overview of a System-on-Chip (SOC), in accordance with some embodiment of the present invention.
Figure 13B:
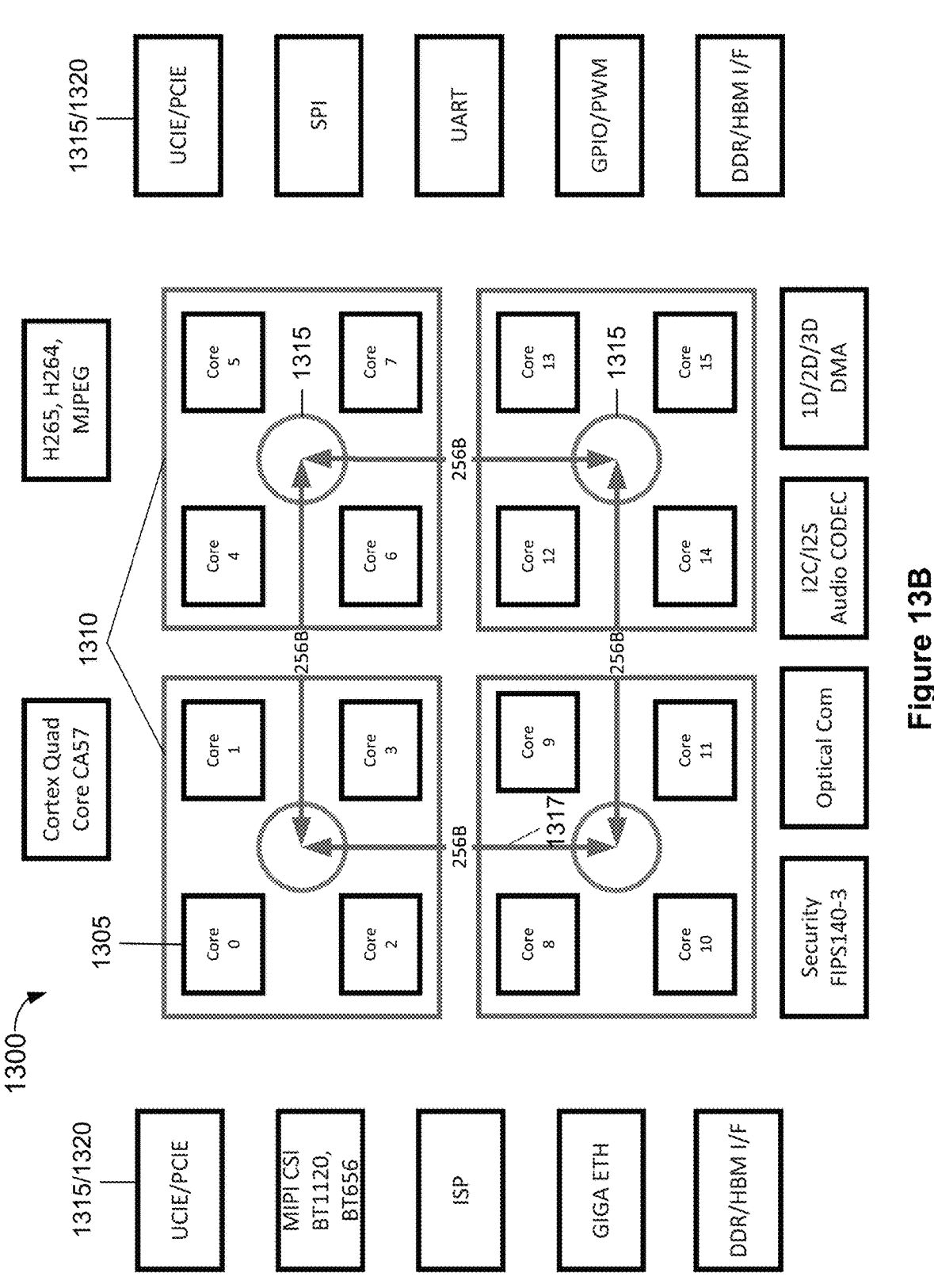

FIG. 13A and FIG. 13B are illustrations of an overview of a System-on-Chip (SOC) 1300, in accordance with some embodiment of the present invention. System-on-Chip (SOC) 1300 features a configuration with, without limitation, 16 cores 1305 where a single core 1305 boasts a staggering 9,216 Accumulators, making it a colossal core, far beyond the capabilities of a mere individual accumulator. Cores 1305 are grouped into quadcore sets 1310, with each quadcore set 1310 interconnected via a bi-directional ring 1315. The quad cores themselves are connected through a Mesh network, utilizing a 256-byte bus 1320, the width of which may be adjusted based on specific requirements. FIG. 13A and FIG. 13B are identical except for the configuration of the 256-byte bus 1320. FIG. 13A shows a winding 256-byte bus 1317 while FIG. 13B shows a straight 256-byte bus 1317. Cores 1305 may include, without limitation, DFPUs 315. The traditional NOC for DFPU (data flow processor unit) may be leveraged, or may use proprietary NOC for mode Swap data, Broadcast and Fetch data.

The SOC may incorporate a comprehensive array of peripheral interfaces and functions to support its intricate operations. The interfaces and functions may be designed to share nodes within the Mesh networks. They may include, without limitation:

UCIE (Universal Chiplet Interconnect Express) 1315: An open specification for die-to-die interconnect and serial bus communication between chiplets.

PCIe (Peripheral Component Interconnect Express) 1320: A high-speed interface standard for connecting various input and output components.

MIPI CSI (Camera Serial Interface): An interface architecture defining protocols for communication between embedded cameras and host processors.

BT656 (8-bit interface with syncs) and ITU1120 (16-bit interface with syncs) for streaming uncompressed PAL or NTSC standard-definition TV.

ISP (Image Signal Processor): Used for processing images in embedded vision camera systems.

GIGA ETH (Gigabit Ethernet): A transmission technology based on Ethernet frame format and protocol used in local area networks.

DDR (Double Data Rate): An advanced version of synchronous dynamic random-access memory.

HBM (High Bandwidth Memory): A standardized stacked memory technology providing wide channels for data transfer.

FIPS (Federal Information Processing Standard) 140-3: A benchmark for validating the effectiveness of cryptographic hardware.

Optical Com: Systems for transmitting information optically through fibers.

I2C/I2S Audio: Communication interfaces for inter-IC data transfer and audio transport.

DMA (Direct Memory Access): A data transfer process without direct processor involvement.

GPIO (General-Purpose Input/Output): Digital signal pins on integrated circuits or electronic boards, controllable by software.

PWM (Pulse Width Modulation): A control technique for generating analog signals from digital devices.

UART (Universal Asynchronous Receiver/Transmitter): A communication protocol circuit for serial data transfer.

SPI (Serial Peripheral Interface): A common interface for short-distance communication between microcontrollers and peripheral integrated circuits.

H.265 and H.264: Common video streaming methods used by services like YouTube and Netflix.

MJPEG (Motion JPEG): A format for individually compressed pictures.

Cortex Quad Core CA57: ARM's Cortex-A57 processor with four cores.

It's important to note that the SOC is a versatile example, and different functions or processors may be combined within it to suit specific applications and requirements.

In one embodiment, Data Flow Processor Unit (DFPU) 315 and System-on-Chip (SoC) 1300 have a close relationship within a computing system. The DFPU serves as a specialized hardware component designed to efficiently perform data processing tasks, particularly suited for AI and machine learning workloads discussed previously. On the other hand, the SoC is a comprehensive integrated circuit that incorporates various hardware components, including processors, memory units, input/output interfaces, and often specialized accelerators like the DFPU.

The relationship between the DFPU and SoC can be described as follows:

Integration: The DFPU is integrated into the larger architecture of the SoC. It operates alongside other components within the SoC, sharing resources and interacting with the system as a whole.

Acceleration: The DFPU functions as an accelerator within the SoC, enhancing the performance and efficiency of specific computing tasks, particularly those related to data-intensive operations like deep learning inference and neural network computations.

Optimization: The DFPU is optimized to work in conjunction with other components of the SoC, leveraging shared resources and communication pathways to maximize overall system performance.

Interface: The DFPU typically interfaces with other components of the SoC through standardized interfaces and protocols, enabling seamless communication and data exchange within the system.

Customization: Depending on the specific application requirements, the DFPU may be customized or configured within the SoC to meet the needs of the targeted workload, ensuring optimal performance and efficiency.

Overall, the DFPU and SoC collaborate closely to deliver efficient and high-performance computing capabilities, particularly in the realm of AI and machine learning applications, where data processing efficiency is paramount.

Figure 14:
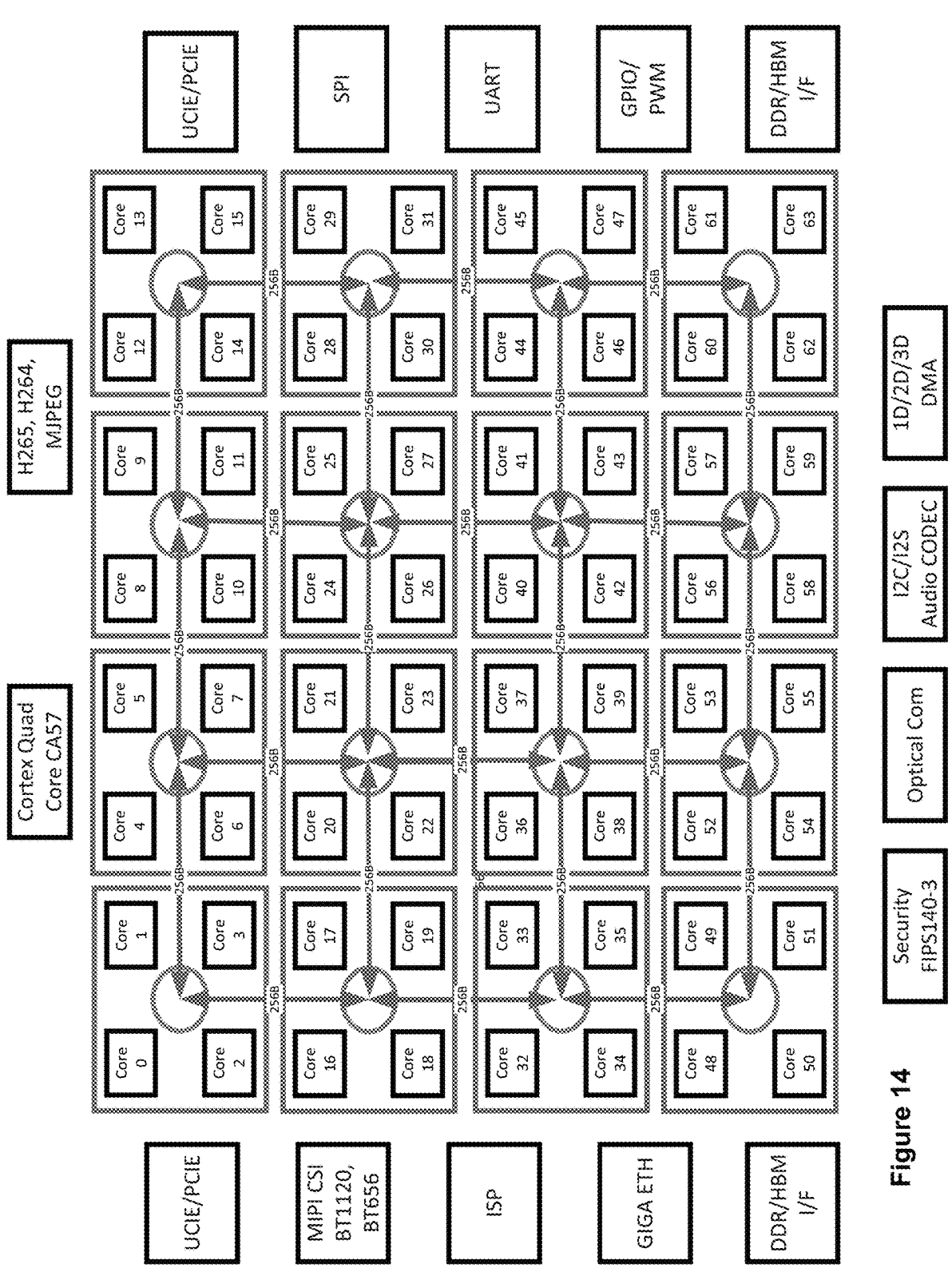
FIG. 14 is an illustration of a larger-scale system with 64 high-dimensional cores interconnected via a Mesh network boasting a 256-byte bus width, in accordance with some embodiment of the present invention.

FIG. 14 is an illustration of a larger-scale system than FIG. 13 with 64 high-dimensional cores interconnected via a Mesh network boasting a 256-byte bus width, in accordance with some embodiment of the present invention. The configuration is highly adaptable and not constrained by the number of cores, making the invention suitable for a wide range of combinations.

In a larger system, where multiple DFPU cores 1305 are integrated into the System-on-Chip (SoC), several considerations arise to ensure optimal performance and functionality:

Memory Channels: With increased computational demands from multiple DFPU cores, additional memory channels become essential to provide sufficient memory bandwidth. This may involve integrating multiple DRAM controllers or increasing the capacity and speed of High Bandwidth Memory (HBM) or DDR memory interfaces within the SoC.

Peripheral Interfaces: To support expanded functionality and connectivity, the SoC may incorporate more channels of camera interfaces, such as MIPI (Mobile Industry Processor Interface) and ISP (Image Signal Processor) interfaces. This allows for the simultaneous processing of data from multiple cameras or sensors, enabling advanced imaging and computer vision applications.

Scalability: The SoC architecture should be designed with scalability in mind, allowing for easy integration of additional DFPU cores, memory channels, and peripheral interfaces as computational requirements grow. This ensures flexibility and adaptability to future system upgrades and enhancements.

System Integration: Proper system integration is crucial to ensure seamless communication and coordination among various components, including, without limitation, DFPU cores, memory interfaces, and peripheral interfaces. This involves efficient routing of data and control signals, as well as synchronization mechanisms to enable synchronized operation of multiple cores and peripherals.

Power and Thermal Management: As the number of DFPU cores 1305 and peripheral interfaces increases, power consumption and thermal dissipation become significant concerns. The SoC design should incorporate advanced power management techniques and thermal mitigation strategies to optimize energy efficiency and maintain thermal stability under varying workloads.

By addressing these considerations, the larger system can effectively harness the computational power of multiple DFPU cores while supporting expanded memory bandwidth, connectivity options, and scalability for diverse application requirements.

Figure 15:
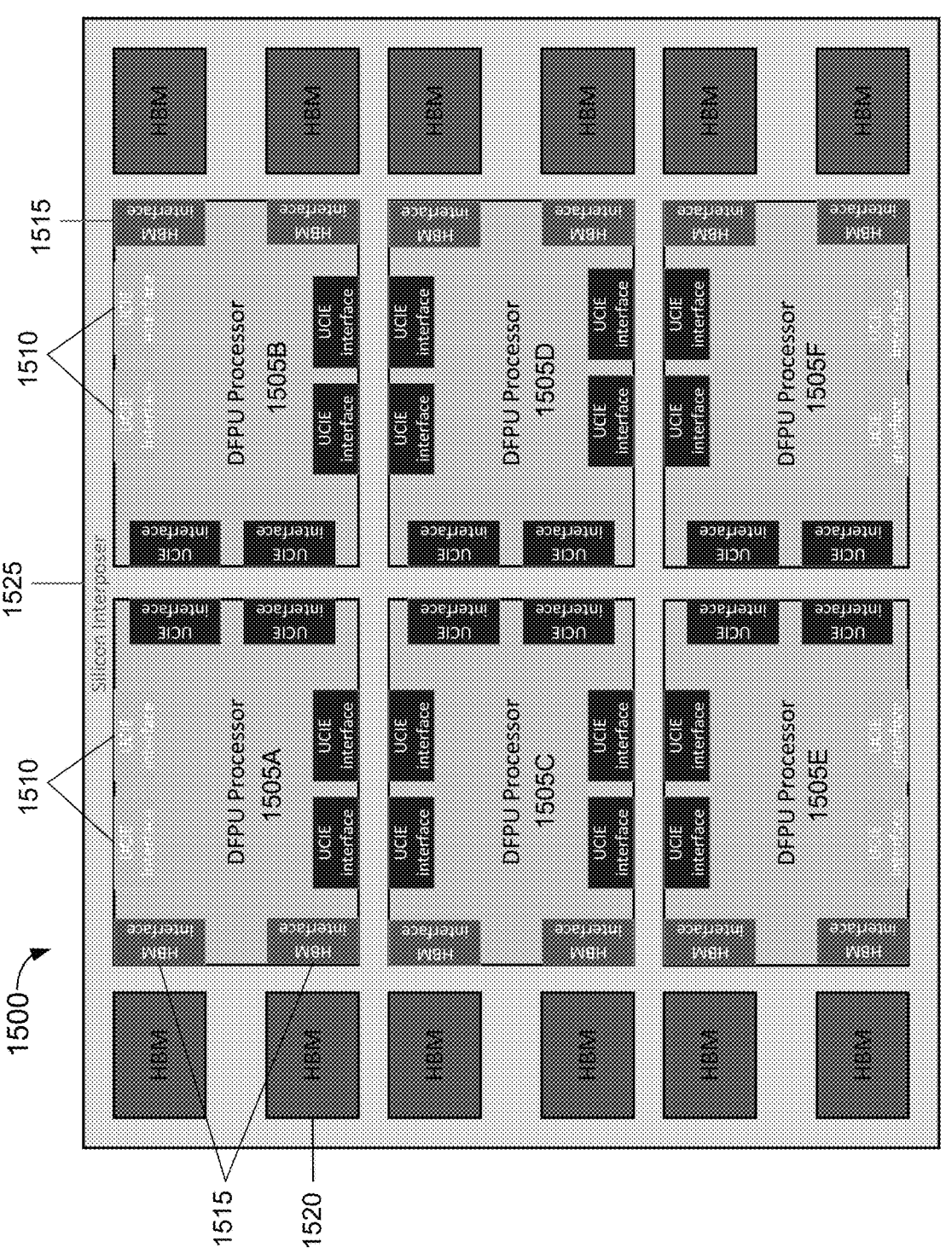
FIG. 15 illustrates an exemplary seamless integration of 6 DFPU processors through UCIE interfaces, in accordance with an embodiment of the present invention.

FIG. 15 illustrates an exemplary seamless integration 1500 of 6 DFPU processors 1505A-1505F through UCIE interfaces 1510, in accordance with an embodiment of the present invention. To optimize the configuration, 6 DFPU processors 1505n are organized into a 3×2 array. The connectivity between the DFPU processors 1505n may be established through two UCIE channels 1510, providing a total of 6 channels per chip 1505n. The arrangement may include, without limitation, two connections for the top, two for the left or right, and two for the bottom, ensuring robust inter-chip communication. Furthermore, each chip 1505n may be equipped with two interfaces 1515, allowing for efficient connections to HBM 1520. In aggregate, there are 12 HBM channels 1515 available for the configuration of 6 chips 1505n. All the connections, both UCIE 1510 and HBM 1515, are facilitated through a Silicon interposer 1525, ensuring seamless integration and data exchange among DFPU processors 1505n. The innovation 1500 enables a versatile range of connection channels and accommodates any number of chip connections. The example presented is merely a straightforward illustration, and the scope of the invention extends beyond the above limitations.

FIG. 13 illustrates a small System-on-Chip (SoC) system, while FIG. 14 depicts a larger SoC system. Both of these systems can leverage packaging technologies such as Chip-on-Wafer-on-Substrate (COWOS) to integrate into a larger chip, as described previously. COWOS enables the integration of multiple chips or components into a single, larger chip package, facilitating enhanced performance, compactness, and efficiency.

FIG. 15 demonstrates the integration of these SoC chips into an even larger chip, enabling support for more extensive tasks and applications. This integration allows for the aggregation of computational resources, memory bandwidth, and peripheral interfaces, enabling the system to handle more significant workloads and deliver enhanced functionality.

Overall, the use of packaging technologies like COWOS and the integration of SoC chips into larger chips enable scalability, performance optimization, and enhanced capabilities for a wide range of applications, from small embedded systems to large-scale computing platforms.

Figure 16:
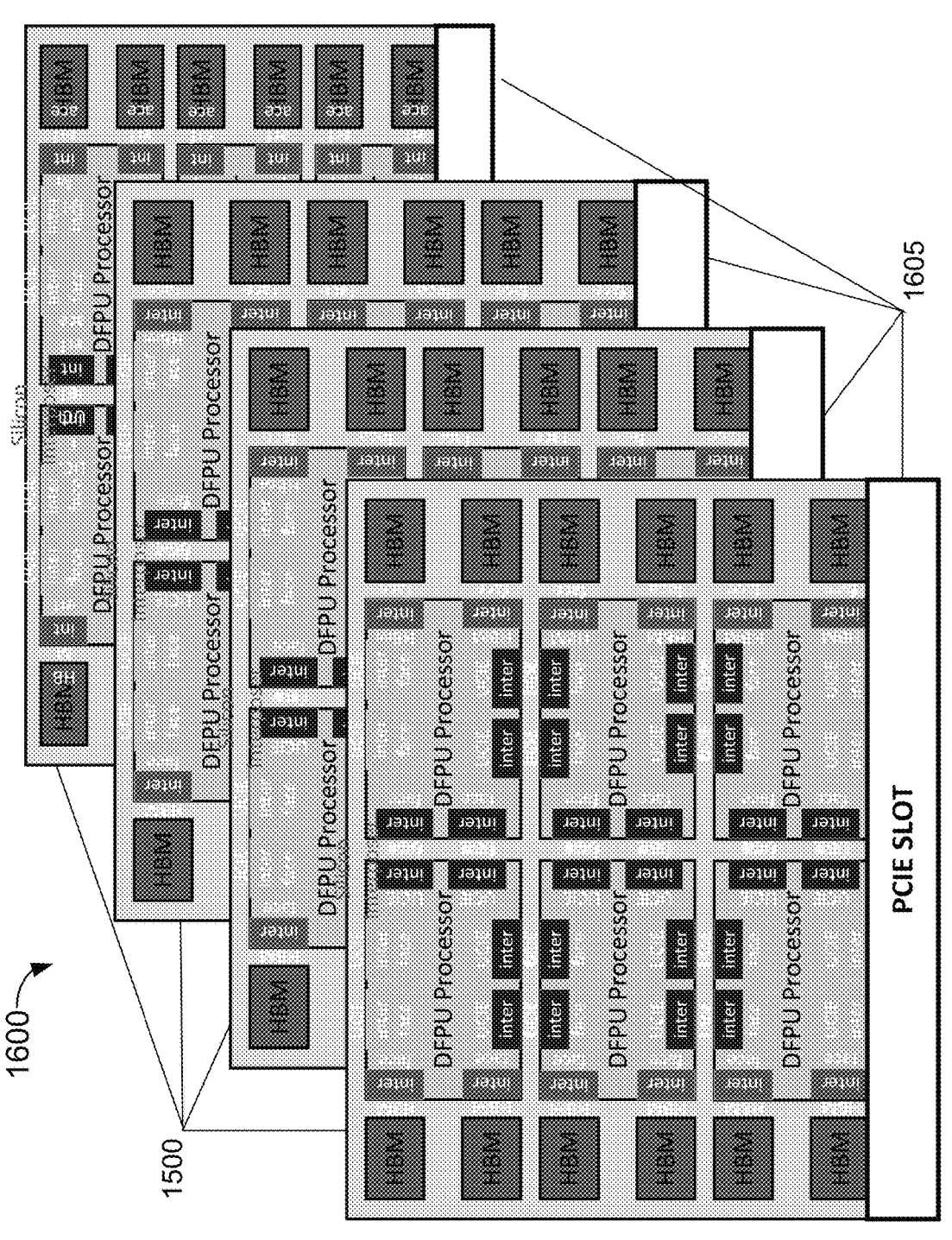
FIG. 16 illustrates an exemplary system with four slots, in accordance with an embodiment of the present invention.

FIG. 16 illustrates an exemplary system 1600 with four (4) PCIe slots 1605, in accordance with an embodiment of the present invention. In an embodiment, the number of slots 1605 is not fixed. The diagram only serves as an illustrative scenario. Referring to FIG. 13, FIG. 15 and FIG. 16, PCIe lanes may serve as the physical link between PCIe-supported devices and DFPU processor/chipset 1505n. PCIe lanes may comprise, without limitation, for example, two pairs of copper wires, commonly referred to as traces, running through a motherboard to establish a connection between the PCIe-enabled device and either the DFPU processor or a motherboard chipset. Furthermore, the approach may include, without limitation, interconnecting two systems through utilization of InfiniBand Technology. FIG. 16 depicts an exemplary utilization of PCIe for linking the preceding chips (HBMs 1520 and SOCs 1300) located on a silicon interposer 1525, which in turn interfaces with a package substrate. The package may be equipped with PCIe lanes to facilitate connections with PCIe slots 1605 within a system.

In some embodiment, designing a protocol for core-to-core data exchange and broadcast in a Network on Chip (NoC) involves defining the rules and procedures for efficient communication between cores within the system.

The Network-on-Chip (NoC) and Data Flow Processor Unit (DFPU) have a crucial relationship within a computing system, particularly in systems designed for parallel processing and efficient data movement. Here's a description of their relationship:

Data Movement: The NoC serves as a communication infrastructure that facilitates data transfer and exchange between different components within a chip or across multiple chips in a system. The DFPU relies on the NoC for efficient movement of data between its cores, memory, and other processing units within the system.

Interconnectivity: The NoC provides a scalable and flexible interconnect fabric that enables high-bandwidth, low-latency communication between DFPU cores, memory banks, peripheral interfaces, and other components in the system. This interconnectivity is essential for coordinating parallel processing tasks and efficiently distributing data across the system.

Task Distribution: In systems with multiple DFPU cores, the NoC plays a crucial role in distributing computational tasks and data across the cores. It ensures that each DFPU core receives the necessary data inputs and communicates effectively with other cores to synchronize operations and exchange intermediate results.

Resource Sharing: The NoC enables efficient resource sharing among DFPU cores, allowing them to access shared memory banks, peripheral interfaces, and accelerators seamlessly. This enables collaborative processing and improves overall system throughput and efficiency.

Scalability: Both the NoC and DFPU are designed with scalability in mind, allowing them to be seamlessly integrated into larger systems with increasing computational demands. The NoC facilitates scalable communication between DFPU cores, while the DFPU architecture supports the integration of additional cores to meet growing processing requirements.

Overall, the relationship between the NoC and DFPU is characterized by their collaborative efforts in enabling efficient data movement, interconnectivity, task distribution, resource sharing, and scalability within a computing system. Together, they form a critical part of the system architecture, particularly in systems optimized for parallel processing and high-performance computing tasks.

Below is a simplified protocol outline for core-to-core data exchange and broadcast in an NoC:

Core-to-Core Data Exchange Protocol:

Initialization: Each core may be assigned a unique identifier (ID) within the NoC. Cores maintain a routing table that maps destination cores to network routes.

Point-to-Point Data Exchange: Sender core initiates data transmission by specifying the destination core's ID. The sender core consults its routing table to determine the optimal path through the NoC. Data packets are encapsulated with header information containing the source and destination core IDs. Data may be transmitted through the NoC along the determined route. Intermediate routers may use the header information to forward data packets to the correct destination core.

Error Handling: Implement error-checking mechanisms such as checksums or error-correcting codes to ensure data integrity. Upon receiving a data packet, the destination core or intermediate routers may perform error checking and request retransmission if errors are detected.

Core-to-Core Data Broadcast Protocol:

Broadcast Initialization: The sender core specifies a broadcast operation, indicating its intent to transmit data to multiple destination cores. The sender core enumerates the list of destination core IDs or specifies a broadcast address.

Data Transmission: Data packets are encapsulated with a broadcast header indicating the source core and the broadcast operation. The sender core sends the data packet into the NoC. Intermediate routers use the broadcast header to replicate and forward data packets to all destination cores specified in the broadcast operation.

Duplicate Management: Destination cores receiving broadcast data must recognize and discard duplicate packets to prevent unnecessary processing. Broadcast headers may include sequence numbers or other information to help cores identify and discard duplicates.

Error Handling: Similar to point-to-point data exchange, broadcast data may include error-checking mechanisms to ensure data integrity.

Broadcast Termination: The sender core may specify the end of the broadcast operation to signal that no more data packets may be broadcast. By following these protocols, cores in an NoC may effectively exchange data on a point-to-point basis or broadcast information to multiple recipients. The protocols facilitate efficient communication and data sharing, critical for the performance of multi-core systems. The exact implementation of the protocols may vary depending on the NoC architecture and hardware specifications.

Dilate Broadcasting to Multiple Groups Protocol: Dilate broadcasting as a mechanism for broadcasting to multiple groups, where each core only transmits data to specific cores within those groups.

Group Formation: Cores are categorized into multiple groups, each assigned a unique group ID. Cores within the same group may share certain characteristics or requirements.

Dilate Broadcast Initialization: The sender core specifies a Dilate broadcast operation, signaling its intention to transmit data to specific cores within multiple groups. The sender core designates the group IDs of the target groups. For each target group, the sender core specifies the individual core IDs within that group that should receive the data.

Data Transmission: Data packets are encapsulated with a Dilate broadcast header, including the source core, the broadcast operation, and the target group IDs along with the recipient core IDs within each group. The sender core dispatches the data packets into the NoC. Intermediate routers examine the broadcast header and replicate the data packet for each specified core within each target group.

Duplicate Management: Destination cores within each group and subgroup receiving Dilate broadcast data must recognize and discard duplicate packets to avoid redundant processing.

Error Handling: Similar to previous protocols, incorporate error-checking mechanisms to ensure data integrity during Dilate broadcasting.

Dilate Broadcast Termination: The sender core may signal the conclusion of the Dilate broadcast operation when no more data packets are intended for distribution within the specified groups. By implementing the Dilate Broadcasting to Multiple Groups Protocol, cores may efficiently transmit data to selected cores within multiple groups, reducing unnecessary data replication and enhancing the precision and efficiency of communication within a Network on Chip. The actual implementation may require sophisticated routing tables and mechanisms to efficiently route data to the specified cores within each group.

Chip-to-Chip Communication Through UCIE Protocol with Security:

UCIE Protocol Integration: Incorporate the UCIE (Universal Chiplet Interconnect Express) protocol for high-speed communication between chiplets within the NoC, facilitating efficient chip-to-chip data exchange.

Security Setup: Implement robust security measures, including encryption, authentication, and access control, to ensure the confidentiality and integrity of data transmitted via UCIE.

UCIE Chip-to-Chip Data Exchange: Sender chip initiates a secure UCIE data transmission request to the target chiplet, providing authentication credentials. Data may be encrypted and encapsulated with a secure header, including source and destination chiplet identifiers. UCIE ensures the efficient and secure transfer of data between chiplets.

Security Verification: The target chiplet verifies the sender's identity and decrypts the received data. Security mechanisms within UCIE validate the authenticity of communication and data integrity.

Security Protocols: Implement security breach handling protocols, such as intrusion detection and response mechanisms, to safeguard UCIE communication from potential security threats.

System-Internal Communication through PCIe with Security and RDMA (Remote Direct Memory Access):

PCIe Integration: Utilize PCIe (Peripheral Component Interconnect Express) communication for fast, secure data exchange within a system, enabling efficient communication between internal components.

Security Setup: Apply robust security measures, including encryption, authentication, and access control, to secure data transmitted via PCIe within the system.

PCIe RDMA Data Transfer: Internal components initiate RDMA requests over PCIe to access memory or resources on the target components, specifying PCIe addresses, permissions, and encryption keys. Data may be transferred directly between memory locations without CPU involvement, reducing latency.

Access Control: Internal components and NoC routers enforce access control mechanisms to ensure that only authorized components may perform PCIe RDMA operations within the system.

RDMA Error Handling: Implement error detection and correction mechanisms to maintain data integrity during PCIe RDMA transfers. Report errors and take corrective actions as necessary.

System-to-System Communication Through InfiniBand with Security and RDMA:

InfiniBand Integration: Employ InfiniBand, a high-speed interconnect technology, for system-to-system data exchange, providing low-latency, high-throughput communication.

Security Setup: Apply robust security measures, including encryption, authentication, and access control, to secure data transmitted via InfiniBand between systems.

InfiniBand RDMA Data Transfer: Source system initiates an RDMA request over InfiniBand to access memory or resources on the target system, specifying InfiniBand addresses, permissions, and encryption keys. Data may be transferred directly between memory locations without CPU involvement, reducing latency.

Access Control: Systems and NoC routers enforce access control mechanisms to ensure that only authorized systems may perform InfiniBand RDMA operations.

RDMA Error Handling: Implement error detection and correction mechanisms to maintain data integrity during InfiniBand RDMA transfers. Report errors and take corrective actions as necessary.

By integrating UCIE for chip-to-chip communication, PCIe for system-internal communication with both security and RDMA support, and InfiniBand for system-to-system communication, the NoC may be well-equipped to facilitate various forms of data exchanges while ensuring security, efficiency, and low latency. Actual implementation may require compatible hardware and software support for the protocols and their respective security and RDMA features.

Accordingly, a Data Flow processor has been developed. "Data Flow Processor" (DFP) and "Data Flow Processor Unit" (DFPU) refer to the same concept—a specialized hardware unit designed to perform data flow computations efficiently, particularly in the context of parallel processing and tasks like deep learning inference.

Regarding packaging, DFPU cores can be packaged together in a single unit or chip. These cores are often integrated into larger system architectures, such as System-on-Chip (SoC) designs, where multiple DFPU cores may be present on the same chip along with other components like CPUs, GPUs, memory units, and peripheral interfaces.

In a single chip packaging embodiment, all the elements and functionalities described earlier, such as interconnectivity, data movement, task distribution, resource sharing, and scalability, may indeed be included within the same packaging. This integration allows for a cohesive and efficient system design, where the DFPU cores can communicate seamlessly with each other and with other components within the chip through a shared communication infrastructure like the Network-on-Chip (NoC).

However, in some cases, DFPU cores may be distributed across multiple chips or packaged separately from other components, depending on the specific system architecture and design considerations. In such scenarios, additional considerations for communication interfaces and protocols may be necessary to facilitate efficient interaction between DFPU cores and other system components.

In summary, while DFPU cores can be packaged together in a single unit or chip, the specific packaging and integration approach may vary depending on the system architecture and design requirements, that excels in high-dimensional computing while drastically reducing the need for multiple instructions, potentially achieving just one instruction per layer. The innovation results in significant power savings by eliminating the energy consumed by instruction fetching, decoding, register allocation, and instruction control. The invention also incorporates near-memory computing, effectively reducing power consumption across various memory hierarchies, particularly in cases of data cache misses. Leveraging Silicon interposer technology, the HBM and UCIE for seamless chip-to-chip communication have been successfully integrated. Additionally, utilization of plural Loop registers and stride registers enhances control over high-dimensional computing, streamlining data retrieval, synchronization, execution, and storage processes. Network on Chip and system-to-system communication to facilitate efficient data exchange were harnessed. While there may be some configuration variations or minor adjustments, all such refinements fall within the scope of the innovative contributions.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C, or Java, Brew or any other suitable programming language. The programs may be resident on a storage medium, e.g., magnetic or optical, e.g., without limitation, the computer hard drive, a removable disk or media such as, without limitation, a memory stick or SD media, or other removable medium. The programs may also be run over a network, for example, with a server or other machine sending signals to the local machine, which allows the local machine to carry out the operations described herein.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

Figure 17:
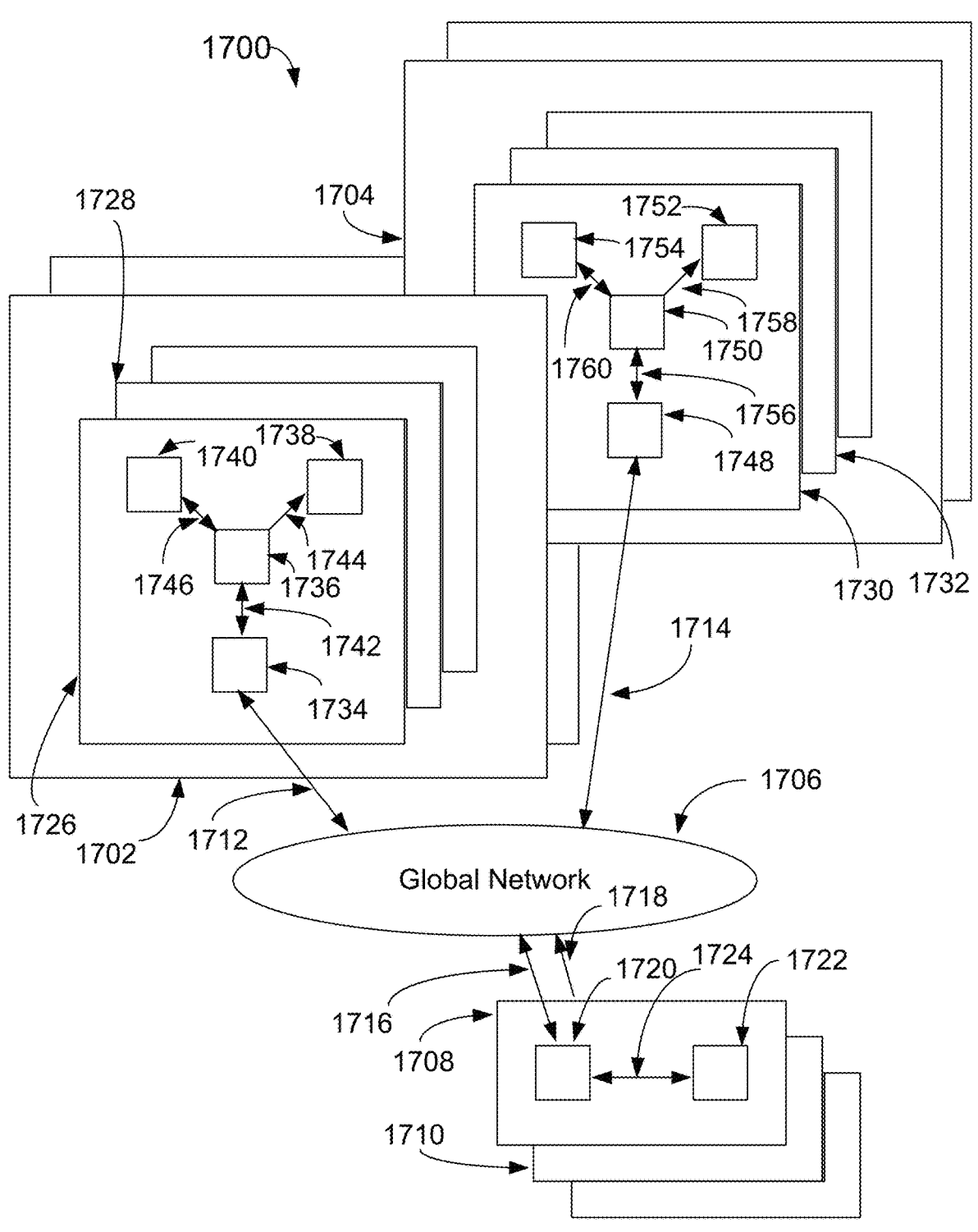
FIG. 17 illustrates a block diagram depicting a conventional client/server communication system, which may be used by an exemplary web-enabled/networked embodiment of the present invention.

FIG. 17 illustrates a block diagram depicting a client/server communication system 1700, which may be used by an exemplary web-enabled/networked embodiment of the present invention. In an embodiment, for example, "core-to-core data exchange and broadcast in a NoC" is used in the exemplary web-enabled/networked embodiment.

Given that the innovation involves the Data Flow Processor Unit (DFPU) and its integration into a larger system architecture, including the System-on-Chip (SoC), the concept of core-to-core data exchange and broadcast in a Network-on-Chip (NoC) is highly relevant.

In the context of the DFPU, which may consist of multiple processing cores working in parallel, the ability for these cores to exchange data efficiently is crucial for maximizing throughput and performance. A NoC provides a scalable and flexible interconnect infrastructure that allows for such communication between cores, as well as with other components within the SoC.

For example, consider a scenario where different DFPU cores need to exchange intermediate results or synchronize their operations during the execution of a deep learning model. By leveraging the NoC, these cores can communicate directly with each other, enabling efficient data exchange and coordination without requiring complex routing through shared memory or other intermediaries.

Additionally, the concept of broadcast in the NoC allows for the dissemination of data from one core to multiple cores simultaneously. This can be particularly useful in scenarios where a single core generates data that needs to be processed by multiple cores in parallel, such as in parallelized convolutional neural network (CNN) operations.

In summary, the concept of core-to-core data exchange and broadcast in a NoC aligns well with the innovation involving the DFPU and SoC integration, providing a practical example of how the communication infrastructure facilitates efficient parallel processing and data movement within the system.

Communication system 1700 may include, without limitation, a multiplicity of networked regions with a sampling of regions denoted as a network region 1702 and a network region 1704, a global network 1706 and a multiplicity of servers with a sampling of servers denoted as a server device 1708 and a server device 1710.

Network region 1702 and network region 1704 may operate to represent a network contained within a geographical area or region. Non-limiting examples of representations for the geographical areas for the networked regions may include postal zip codes, telephone area codes, states, counties, cities and countries. Elements within network region 1702 and 1704 may operate to communicate with external elements within other networked regions or within elements contained within the same network region.

In some implementations, global network 1706 may operate as the Internet. It will be understood by those skilled in the art that communication system 1700 may take many different forms. Non-limiting examples of forms for communication system 1700 include local area networks (LANs), wide area networks (WANs), wired telephone networks, cellular telephone networks or any other network supporting data communication between respective entities via hardwired or wireless communication networks. Global network 1706 may operate to transfer information between the various networked elements.

Server device 1708 and server device 1710 may operate to execute software instructions, store information, support database operations and communicate with other networked elements. Non-limiting examples of software and scripting languages which may be executed on server device 1708 and server device 1710 include C, C++, C# and Java.

Network region 1702 may operate to communicate bi-directionally with global network 1706 via a communication channel 1712. Network region 1704 may operate to communicate bi-directionally with global network 1706 via a communication channel 1714. Server device 1708 may operate to communicate bi-directionally with global network 1706 via a communication channel 1716. Server device 1710 may operate to communicate bi-directionally with global network 1706 via a communication channel 1718. Network region 1702 and 1704, global network 1706 and server devices 1708 and 1710 may operate to communicate with each other and with every other networked device located within communication system 1700.

Server device 1708 includes a networking device 1720 and a server 1722. Networking device 1720 may operate to communicate bi-directionally with global network 1706 via communication channel 1716 and with server 1722 via a communication channel 1724. Server 1722 may operate to execute software instructions and store information.

Network region 1702 includes a multiplicity of clients with a sampling denoted as a client 1726 and a client 1728. Client 1726 includes a networking device 1734, a processor 1736, a GUI 1738 and an interface device 1740. Non-limiting examples of devices for GUI 1738 include monitors, televisions, cellular telephones, smartphones and PDAs (Personal Digital Assistants). Non-limiting examples of interface device 1740 include pointing device, mouse, trackball, scanner and printer. Networking device 1734 may communicate bi-directionally with global network 1706 via communication channel 1712 and with processor 1736 via a communication channel 1742. GUI 1738 may receive information from processor 1736 via a communication channel 1744 for presentation to a user for viewing. Interface device 1740 may operate to send control information to processor 1736 and to receive information from processor 1736 via a communication channel 1746. Network region 1704 includes a multiplicity of clients with a sampling denoted as a client 1730 and a client 1732. Client 1730 includes a networking device 1748, a processor 1750, a GUI 1752 and an interface device 1754. Non-limiting examples of devices for GUI 1738 include monitors, televisions, cellular telephones, smartphones and PDAs (Personal Digital Assistants). Non-limiting examples of interface device 1740 include pointing devices, mousse, trackballs, scanners and printers. Networking device 1748 may communicate bi-directionally with global network 1706 via communication channel 1714 and with processor 1750 via a communication channel 1756. GUI 1752 may receive information from processor 1750 via a communication channel 1758 for presentation to a user for viewing. Interface device 1754 may operate to send control information to processor 1750 and to receive information from processor 1750 via a communication channel 1760.

For example, consider the case where a user interfacing with client 1726 may want to execute a networked application. A user may enter the IP (Internet Protocol) address for the networked application using interface device 1740. The IP address information may be communicated to processor 1736 via communication channel 1746. Processor 1736 may then communicate the IP address information to networking device 1734 via communication channel 1742. Networking device 1734 may then communicate the IP address information to global network 1706 via communication channel 1712. Global network 1706 may then communicate the IP address information to networking device 1720 of server device 1708 via communication channel 1716. Networking device 1720 may then communicate the IP address information to server 1722 via communication channel 1724. Server 1722 may receive the IP address information and after processing the IP address information may communicate return information to networking device 1720 via communication channel 1724. Networking device 1720 may communicate the return information to global network 1706 via communication channel 1716. Global network 1706 may communicate the return information to networking device 1734 via communication channel 1712. Networking device 1734 may communicate the return information to processor 1736 via communication channel 1742. Processor 17176 may communicate the return information to GUI 17178 via communication channel 1744. User may then view the return information on GUI 1738.

Figure 18:
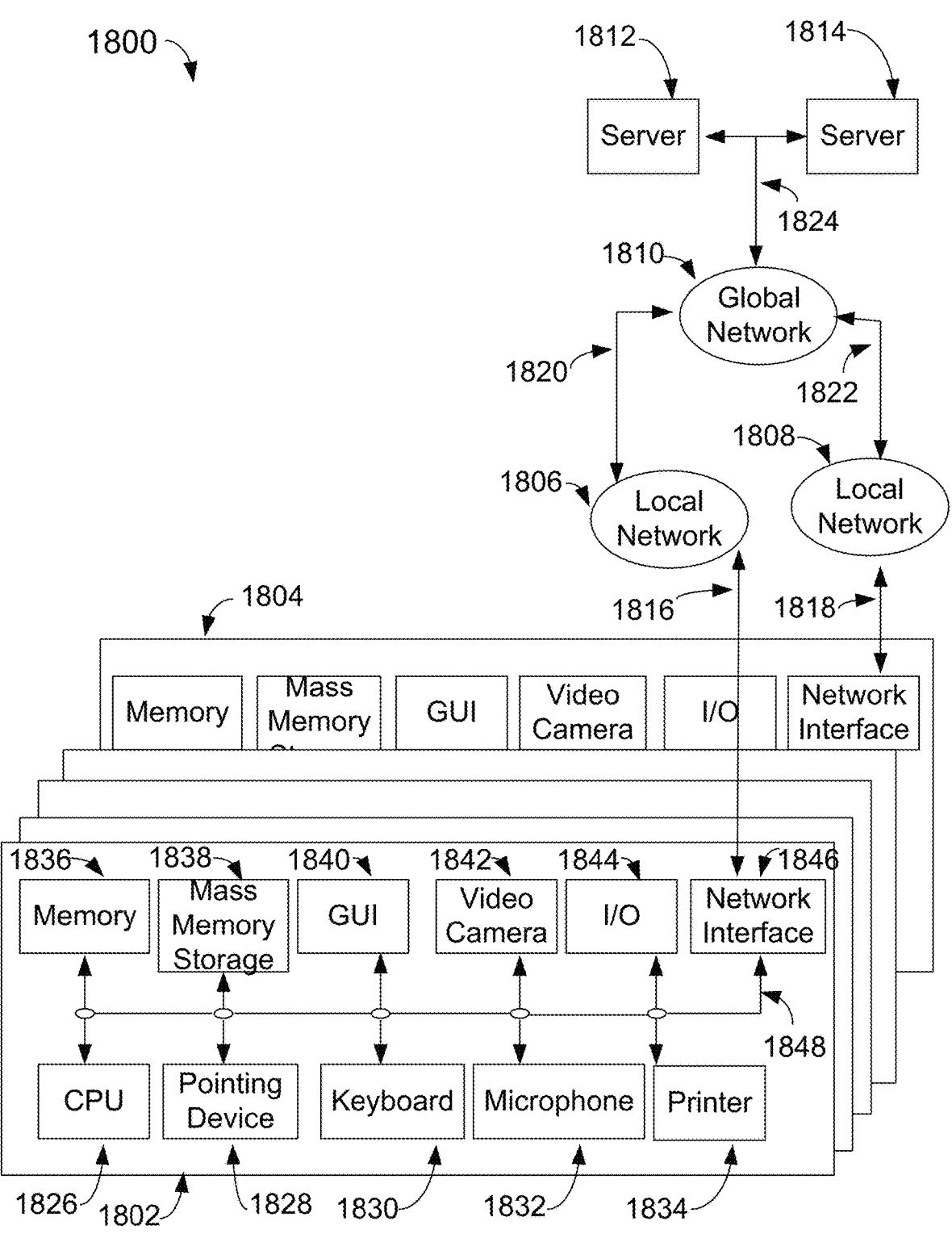
FIG. 18 is a block diagram depicting an exemplary client/server system which may be used by an exemplary web-enabled/networked embodiment of the present invention.

FIG. 18 is a block diagram depicting an exemplary client/server system which may be used by an exemplary web-enabled/networked embodiment of the present invention.

A communication system 1800 includes a multiplicity of clients with a sampling of clients denoted as a client 1802 and a client 1804, a multiplicity of local networks with a sampling of networks denoted as a local network 1806 and a local network 1808, a global network 1810 and a multiplicity of servers with a sampling of servers denoted as a server 1812 and a server 1814.

Client 1802 may communicate bi-directionally with local network 1806 via a communication channel 1816. Client 1804 may communicate bi-directionally with local network 1808 via a communication channel 1818. Local network 1806 may communicate bi-directionally with global network 1810 via a communication channel 1820. Local network 1808 may communicate bi-directionally with global network 1810 via a communication channel 1822. Global network 1810 may communicate bi-directionally with server 1812 and server 1814 via a communication channel 1824. Server 1812 and server 1814 may communicate bi-directionally with each other via communication channel 1824. Furthermore, clients 1802, 1804, local networks 1806, 1808, global network 1810 and servers 1812, 1814 may each communicate bi-directionally with each other.

In one embodiment, global network 1810 may operate as the Internet. It will be understood by those skilled in the art that communication system 1800 may take many different forms. Non-limiting examples of forms for communication system 1800 include local area networks (LANs), wide area networks (WANs), wired telephone networks, wireless networks, or any other network supporting data communication between respective entities.

Clients 1802 and 1804 may take many different forms. Non-limiting examples of clients 1802 and 1804 include personal computers, personal digital assistants (PDAs), cellular phones and smartphones.

Client 1802 includes a CPU 1826, a pointing device 1828, a keyboard 1830, a microphone 1832, a printer 1834, a memory 1836, a mass memory storage 1838, a GUI 1840, a video camera 1842, an input/output interface 1844 and a network interface 1846.

CPU 1826, pointing device 1828, keyboard 1830, microphone 1832, printer 1834, memory 1836, mass memory storage 1838, GUI 1840, video camera 1842, input/output interface 1844 and network interface 1846 may communicate in a unidirectional manner or a bi-directional manner with each other via a communication channel 1848. Communication channel 1848 may be configured as a single communication channel or a multiplicity of communication channels.

CPU 1826 may be comprised of a single processor or multiple processors. CPU 1826 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors.

As is well known in the art, memory 1836 is used typically to transfer data and instructions to CPU 1826 in a bi-directional manner. Memory 1836, as discussed previously, may include any suitable computer-readable media, intended for data storage, such as those described above excluding any wired or wireless transmissions unless specifically noted. Mass memory storage 1838 may also be coupled bi-directionally to CPU 1826 and provides additional data storage capacity and may include any of the computer-readable media described above. Mass memory storage 1838 may be used to store programs, data and the like and is typically a secondary storage medium such as a hard disk. It may be appreciated that the information retained within mass memory storage 1838, may, in appropriate cases, be incorporated in standard fashion as part of memory 1836 as virtual memory.

CPU 1826 may be coupled to GUI 1840. GUI 1840 enables a user to view the operation of computer operating system and software. CPU 1826 may be coupled to pointing device 1828. Non-limiting examples of pointing device 1828 include computer mouse, trackball and touchpad. Pointing device 1828 enables a user with the capability to maneuver a computer cursor about the viewing area of GUI 1840 and select areas or features in the viewing area of GUI 1840. CPU 1826 may be coupled to keyboard 1830. Keyboard 1830 enables a user with the capability to input alphanumeric textual information to CPU 1826. CPU 1826 may be coupled to microphone 1832. Microphone 1832 enables audio produced by a user to be recorded, processed and communicated by CPU 1826. CPU 1826 may be connected to printer 1834. Printer 1834 enables a user with the capability to print information to a sheet of paper. CPU 1826 may be connected to video camera 1842. Video camera 1842 enables video produced or captured by user to be recorded, processed and communicated by CPU 1826.

CPU 1826 may also be coupled to input/output interface 1844 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1826 optionally may be coupled to network interface 1846 which enables communication with an external device such as a database or a computer or telecommunications or internet network using an external connection shown generally as communication channel 1816, which may be implemented as a hardwired or wireless communications link using suitable conventional technologies. With such a connection, CPU 1826 might receive information from the network, or might output information to a network in the course of performing the method steps described in the teachings of the present invention.

In a further embodiment, the following are some broader variations and creative examples of the embodiments and implementations described above, along with explanations of how they can be modified for different applications or configurations:

DFPU Integration in Various Systems: The DFPU can be integrated into a wide range of systems beyond traditional SoCs, including microcontrollers, embedded systems, edge devices, and specialized accelerators for specific applications like image processing, natural language processing, autonomous vehicles, and robotics.

Flexible Communication Infrastructure: Instead of a fixed NoC, the DFPU can be designed to interface with various communication architectures, including point-to-point links, bus-based systems, and custom interconnects tailored to specific application requirements or system constraints.

Modular DFPU Configuration: The DFPU architecture can be modular, allowing for flexible configuration and scaling based on the specific computational needs of different applications. For example, the number of processing cores, memory resources, and peripheral interfaces can be dynamically adjusted to optimize performance and power efficiency.

Cross-Platform Compatibility: The DFPU can be designed to work seamlessly across different hardware platforms, including CPUs, GPUs, FPGAs, and ASICs, enabling easy integration into existing systems and compatibility with diverse software ecosystems and development frameworks.

Application-Specific Optimization: Each DFPU core can be optimized for specific application domains or computational tasks, such as convolutional neural network (CNN) inference, transformer based neural network, recurrent neural network (RNN) processing, signal processing, scientific computing, and real-time control systems. This allows for tailored performance enhancements and efficiency improvements for different application scenarios.

Low-Power and High-Efficiency Designs: The DFPU architecture can be optimized for low-power operation and energy efficiency, enabling deployment in battery-powered devices, IoT (Internet of Things) endpoints, wearable devices, and other energy-constrained environments. Techniques such as voltage scaling, clock gating, and dynamic power management can be employed to minimize power consumption while maintaining performance.

Scalable Parallel Processing: The DFPU can support various parallel processing paradigms, including SIMD (Single Instruction, Multiple Data), MIMD (Multiple Instruction, Multiple Data), multiple dimensional data, and task-level parallelism, allowing for efficient utilization of computational resources across different types of algorithms and workloads.

Real-Time Processing and Predictive Analytics: The DFPU can be utilized for real-time data processing and analysis in applications such as predictive maintenance, anomaly detection, fault diagnosis, and predictive analytics. By leveraging its high-performance computing capabilities, the DFPU can enable rapid decision-making and actionable insights from streaming data sources in mission-critical systems.

These examples illustrate the versatility and potential applications of the DFPU across a wide range of industries and use cases. By providing flexible configurations, optimized designs, and scalable performance, the DFPU can address diverse challenges and unlock new opportunities for innovation in computing and data processing.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any 3$^{rd}$ parties. Applicant(s) also reserves the right to later amend the present application to explicitly include citations to such documents and/or explicitly include the functionally corresponding structures which were incorporated by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing data flow processing units according to the present invention will be apparent to those skilled in the art. Various aspects of the invention have been described above by way of illustration, and the specific embodiments disclosed are not intended to limit the invention to the particular forms disclosed. The particular implementation of the data flow processing units may vary depending upon the particular context or application. By way of example, and not limitation, the data flow processing units described in the foregoing were principally directed to data flow process and storage I/O acceleration implementations; however, similar techniques may instead be applied to artificial intelligence and/or machine learning, big data analytics and/or processing, video transcoding and/or streaming, network traffic processing and/or security, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A processor comprising:

at least one or more work group(s) of feature map(s);

at least one Or more work group(s) of weight(s);

at least one or more loop register(s), said one or more loop register(s) is/are configured to be operable for controlling the processing of multi-dimensional data;

wherein said at least one or more loop register(s) is/are configured to ore and/or manage at least one of said one or more work group(s) of feature map(s), one or more work group(s) of weight(s), and to accumulate at least one or more value(s) in one or more accumulator(s);

at least one or more stride register(s), said one or more stride register(s) is/are configured to be operable for at least one of, addressing of data, enabling comprehensive management of data fetching, execution, accumulation, and result write-back processes;

wherein said one or more stride register(s) is/are configured to store and/or manage at least one of said, one or more work group(s) of feature map(s), one or more work group(s) of weight(s), and to accumulate at least one or more value(s) in said one or more accumulator (s);

wherein said processor comprises at least one or more Data Flow Processor (DFP or DFPU) that is/are configured to be operable for high-dimensional computing, streamlining data retrieval, synchronization, execution, and/or storage processes; and wherein said one or more stride register(s) is/are further configured to enhance the processor's capacity for said high-dimensional computing, streamlining data retrieval, synchronization, execution, and/or storage processes.

2. The processor of claim 1, wherein said one or more stride registers comprise:

at least one or more feature stride registers, wherein said at least one or more feature stride registers is/are configured to specify locations of features in multiple dimensions, across multiple cores, chips, or systems;

at least one or more weight stride registers, wherein said at least one or more weight stride registers is/are configured to define locations within multiple addresses in a core, across different cores, chips, or systems; and at least one or more a result stride register(s), wherein said at least one or more a result stride register(s) is/are configured to specify addresses across multiple dimensions.

3. The processor of claim 2, wherein said one or more loop registers comprise:

at least one or more fLoop register(s) set, wherein said one or more fLoop register(s) set is/are configured to define address stride(s) for each count and dimension; and at least one or more wLoop register(s) set, wherein said one or more wLoop register(s) set is/are configured to serve as weight loop count register(s) for multiple dimensions.

4. The processor of claim 3, further comprising:

an arithmetic logic unit (ALU), wherein said ALU comprises a multi-dimensional adder tree group; and an aLoop registers set, wherein said aLoop registers set is configured to control said ALU actions, including action type, action direction, and/or result write-back.

5. The processor of claim 1, wherein said one or more Data Flow Processor (DFP or DFPU) is/are further configured to minimize multiple instructions.

6. The processor of claim 1, further comprising a near-memory computing implement that is configured to reduce power consumption across various memory hierarchies including data cache misses.

7. The processor of claim 5, wherein said near-memory computing implement comprises a near-memory storage device with multiple banks, and wherein said multiple banks are configured to optimize a storage and retrieval of data, reducing power consumption across memory hierarchies, and enhancing the processor's high-dimensional computing capabilities.

8. The processor of claim 1, further comprising:

a memory subsystem, wherein said memory subsystem is configured to at least one of send Read Data and receive Write Data;

a Read/write action block that is configured to oversee, manage, and/or control reading and/or writing to said memory subsystem.

9. The processor of claim 8, further comprising:

an Address Generation module that is configured to generate read and write addresses and sends control signals to said read/write action block;

a Block level Decompress or Block Decompression Logic device that is configured to process the Read Data into data and decompress data;

a Work group of Feature map register;

a Work group of Kernel Weight register; and wherein at least one of said Work group of Feature map register and Work group of Kernel Weight register is configured to store the decompressed data.

10. The processor of claim 9, further comprising:

at least one or more arbitrator or arbiter control device, wherein said one or more arbitrator or arbiter control device is/are configured to determine whether to initiate read requests for feature maps or weights, or write requests for results and communicate the information to said Address Generation module; and wherein the processor's capacity for high-dimensional computing is enhanced by optimizing data retrieval, synchronization, execution, and storage processes across the various or multiple memory banks.

11. The processor of claim 1, wherein:

said one or more loop register(s) is further configured to enhance the processor's capacity for said high-dimensional computing, streamlining data retrieval, synchronization, execution, and/or storage processes.

12. The processor of claim 11, further comprising:

at least one or more Address Generator(s), said one more Address Generator(s) is/are configured to systematically generate addresses for the feature maps work groups and/or work groups of weights;

wherein said one or more Address Generator(s) is/are configured to enhance the processor's capability for high-dimensional computing by facilitating precise data retrieval, synchronization, execution, and storage processes within the feature maps work groups and/or work groups of weights; and a memory subsystem.

13. The processor of claim 12, further comprising:

a Block Decompression Logic device that is configured to handle sparsity decompression operations;

a Block Compression Logic device that is configured to handle sparsity compression operations; and wherein said Block Decompression and Compression Logic devices enhances the processor's capacity for high-dimensional computing by optimizing data handling, retrieval, synchronization, execution, and storage processes of sparse data.

14. The processor of claim 13, incorporating an AES function for robust key management, providing enhanced security for the storage of weights, The feature ensures the protection of sensitive weight data and enhances the processor's high-dimensional computing capabilities, optimizing data retrieval, synchronization, execution, and storage processes while maintaining data security.

15. The processor of claim 1, further comprising one or more quad cores, where said one or more quad cores is/are organized into groups and interconnected via a concentrated Mesh Network on Chip (NoC) topology.

16. The processor of claim 15, employing a Ring topology for efficient communication among individual quad cores and employing a concentrated Mesh Network to facilitate seamless and high-speed data exchange between quad cores within said processor, enhancing control over high-dimensional computing, data retrieval, synchronization, execution, and storage processes.

17. The processor of claim 15, wherein said processor employing at least one or more Universal Chip Interface Extension (UCIE) technology for efficient chip-to-chip communication, enhancing a seamless exchange of data between integrated components, thereby streamlining high-dimensional computing, data retrieval, synchronization, execution, and storage processes.

18. The processor of claim 1, further comprising PCIe for board-level communication, facilitating efficient data exchange and coordination between components, thereby enhancing high-dimensional computing capabilities and optimizing data retrieval, synchronization, execution, and storage processes.

19. The processor as described in claim 18, further comprising RDMA for data communication through said PCIe within a system, enabling efficient, low-latency data exchange and enhancing high-dimensional computing capabilities while optimizing data retrieval, synchronization, execution, and storage processes.

20. The processor of claim 19, wherein said processor is further configured to employ InfiniBand technology for connecting multiple systems to each other, while also incorporating said RDMA (Remote Direct Memory Access) for high-efficiency and low-latency data communication between systems.

21. The processor of claim 3, further comprising a software product code that is configured to perform a 2D convolution operation on at least one of, one or more input tensor(s), one or more filter tensor, and one or more weight tensor(s).

22. The processor of claim 21, wherein said software product code is further configured to perform a matrix multiplication between two matrices.

23. The processor of claim 3, where said processor is integrated with at least one or more High Bandwidth Memory (HBM) and at least one or more Universal Chip Interface Extension (UCIE) through Silicon interposer technology, facilitating efficient chip-to-chip communication.

24. A processor comprising:

a plurality of loop registers to effectively control the processing of multi-dimensional data;

at least one or more feature stride registers, wherein said at least one or more feature stride registers is/are configured to specify locations of features in multiple dimensions, across multiple cores, chips, or systems;

at least one or more weight stride registers, wherein said at least one or more weight stride registers is/are configured to define locations within multiple addresses in a core, across different cores, chips, or systems;

at least one or more a result stride registers, wherein said at least one or more a result stride registers is/are configured to specify result addresses across multiple dimensions; and wherein said processor comprises a Data Flow Processor (DFP or DFPU) that is configured to be operable for high-dimensional computing.

25. The processor of claim 24, wherein said plurality of loop registers comprise:

a fLoop registers set, wherein said fLoop registers set is configured to define address strides for each count and dimension; and a wLoop registers set, wherein said wLoop registers set is configured to serve as weight loop count registers for multiple dimensions.

26. The processor of claim 25, further comprising:

an arithmetic logic unit (ALU), wherein said ALU comprises a multi-dimensional adder tree group; and an aLoop registers set, wherein said aLoop registers set is configured to control an action of said arithmetic logic unit (ALU), including action type, action direction, and/or result write-back.

27. A processor comprising:

a fLoop registers set, wherein said fLoop registers set is configured to define address strides for each count and dimension;

a wLoop registers set, wherein said wLoop registers set is configured to serve as weight loop count registers for multiple dimensions;

an arithmetic logic unit (ALU), wherein said ALU comprises a multi-dimensional adder tree group;

an aLoop registers set, wherein said aLoop registers set is configured to control said ALU actions, including action type, action direction, and/or result write-back;

at least one or more stride register(s) that is/are operable for addressing of data, enabling comprehensive management of data fetching, execution, accumulation, and result write-back processes; and wherein said processor comprises a Data Flow Processor (DFP or DFPU) that is configured to be operable for high-dimensional computing.

28. The processor of claim 27, wherein said plurality of stride registers comprise:

at least one or more feature stride registers, wherein said at least one or more feature stride registers is/are configured to specify locations of features in multiple dimensions, across multiple cores, chips, or systems;

at least one or more weight stride registers, wherein said at least one or more weight stride registers is/are configured to define locations within multiple addresses in a core, across different cores, chips, or systems; and at least one or more a result stride registers, wherein said at least one or more a result stride registers is/are configured to specify result addresses across multiple dimensions.

29. The processor of claim 27, further comprising:

a Read/write action block that is configured to oversee, manage, and/or control reading and/or writing across various or multiple memory banks; and an Address Generation module that is configured to generate read and write addresses and sends control signals to said Read/write action block.

30. The processor of claim 29, further comprising:

an arbitrator or arbiter control device, wherein said arbitrator or arbiter control device is configured to determine whether to initiate read requests for feature maps or weights, or write requests for results and communicate the information to said Address Generation module.

\* \* \* \* \*